United States Patent
Williams et al.

(10) Patent No.: US 6,262,565 B1
(45) Date of Patent: Jul. 17, 2001

(54) ELECTRICAL LOAD SWITCH

(75) Inventors: Jonathan David Williams; Doug Myron, both of Austin, TX (US); Bryce Leonard Hesterman, Madison, AL (US); David Martini, S. Giovanni; Lorenzo Cincinelli, Levane, both of (IT); Richard Frankeny, Austin, TX (US); Dennis Michael Obrien, Austin, TX (US); Guillermo Avellon, Austin, TX (US)

(73) Assignee: Mytech Corporation, Austin, TX (US)

( * ) Notice: Subject to any disclaimer, the term of this patent is extended or adjusted under 35 U.S.C. 154(b) by 0 days.

(21) Appl. No.: 09/307,121

(22) Filed: May 7, 1999

(51) Int. Cl.⁷ ................................................. G05F 1/10
(52) U.S. Cl. ................................................. 323/237
(58) Field of Search ..................... 323/237, 239, 323/241, 320, 322, 325

(56) References Cited

U.S. PATENT DOCUMENTS

| | | | |
|---|---|---|---|
| 3,506,905 | 4/1970 | Thomas | 321/18 |
| 4,063,307 | 12/1977 | Stephens | 363/21 |
| 4,126,830 | 11/1978 | Schade, Jr. | 330/277 |
| 4,127,895 | 11/1978 | Krueger | 363/86 |
| 4,158,863 | 6/1979 | Naylor | 361/56 |
| 4,183,082 | 1/1980 | Ishii | 363/89 |
| 4,385,336 | 5/1983 | Takeshita et al. | 361/42 |
| 4,428,018 | 1/1984 | Hahn | 361/42 |
| 4,430,683 | 2/1984 | Kawai et al. | 361/42 |
| 4,478,468 | 10/1984 | Schoen et al. | 315/291 |
| 4,481,564 | 11/1984 | Balaban | 363/21 |
| 4,609,982 | 9/1986 | Gohda | 363/89 |
| 4,641,233 | 2/1987 | Roy | 363/89 |
| 4,685,022 | 8/1987 | Nichols, III et al. | 361/44 |
| 4,874,962 | 10/1989 | Hermans | 307/116 |
| 4,992,723 | 2/1991 | Zylstra et al. | 323/284 |
| 5,134,355 | 7/1992 | Hastings et al. | 323/211 |
| 5,161,240 | 11/1992 | Johnson | 361/42 |
| 5,175,477 | 12/1992 | Grissom | 315/291 |
| 5,191,318 | 3/1993 | Glennon | 340/635 |
| 5,192,896 | 3/1993 | Qin | 315/224 |
| 5,307,257 | 4/1994 | Fukushima | 363/53 |
| 5,373,224 | * 12/1994 | Rabier et al. | 323/244 |
| 5,382,882 | 1/1995 | Nerone | 315/307 |
| 5,408,162 | 4/1995 | Williams | 315/224 |
| 5,428,494 | 6/1995 | Ahuja | 361/62 |
| 5,451,845 | 9/1995 | Ribarich | 315/225 |
| 5,453,665 | 9/1995 | Konopka | 315/219 |
| 5,455,491 | 10/1995 | Hajagos et al. | 315/291 |
| 5,481,163 | 1/1996 | Nakamura et al. | 315/308 |
| 5,585,713 | * 12/1996 | Crane et al. | 323/323 |
| 5,614,812 | 3/1997 | Wagoner | 323/222 |
| 5,703,764 | 12/1997 | Hermann et al. | 363/21 |
| 5,729,120 | * 3/1998 | Stich et al. | 323/237 |
| 5,757,635 | 5/1998 | Seong | 363/89 |
| 5,811,963 | 9/1998 | Elwell | 323/318 |
| 5,909,365 | 6/1999 | Merwin et al. | 363/89 |
| 5,968,440 | * 10/1999 | Hettinga | 264/328.1 |
| 5,994,883 | * 11/1999 | Liu | 323/237 |
| B1 4,874,962 | 10/1989 | Hermans | 307/116 |

* cited by examiner

Primary Examiner—Adolf Deneke Berhane
(74) Attorney, Agent, or Firm—Fulbright & Jaworski

(57) ABSTRACT

A controllable electrical switch having a power system and switching device for connecting a source voltage to a load. The power system includes a switching regulator to extract energy directly off the non filtered full wave rectified input voltage to minimize the average magnitude of the current when the switching device is in the off-state. For on-state power the controllable electrical switch may include a transformer connected in series with the switching device. The controllable electrical switch and power system may be used to replace a standard two- wire or three-wire wall switch, and may be used over a wide voltage and load power range in a low cost, small package with low power dissipation.

52 Claims, 20 Drawing Sheets

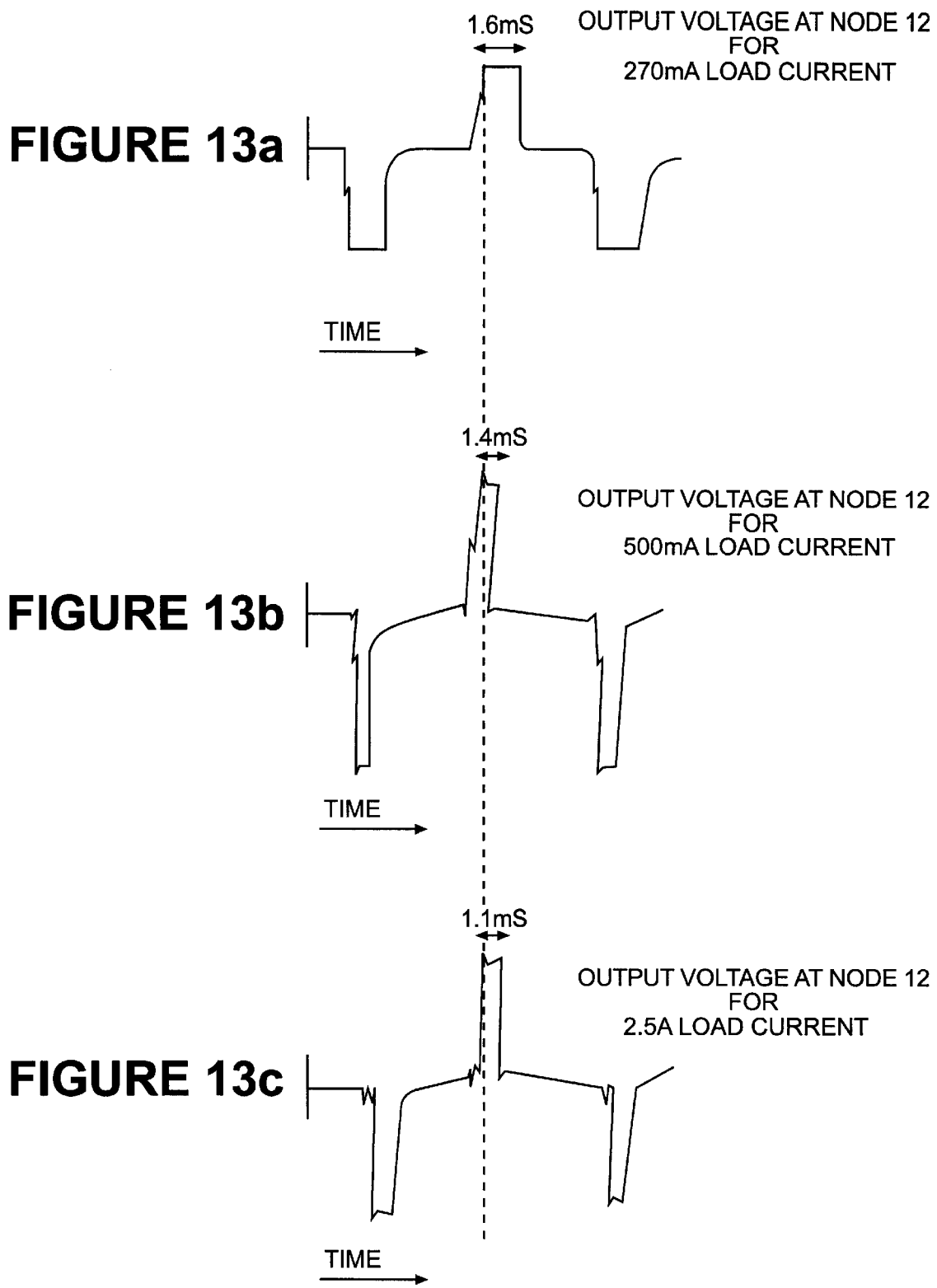

WAVEFORM OF VOLTAGE FROM NODE 3 TO NODE 4

WAVEFORM OF CURRENT INTO LOAD 2

ELECTRICAL LOAD SWITCH

BACKGROUND OF THE INVENTION

The present invention relates to power systems and more particularly to power systems that generate regulated power for use in electrical load switches including, for example, lighting system switches.

Commercially available units have been designed to replace existing wall switches in commercial and private applications. These units typically include load switching devices that replace the existing mechanical switch contacts that are used to switch the electrical load. These load switching devices may include relays, SCRs Triacs, transistors, or other electrical load switching devices that may be controlled by power control circuitry including, for example, a programmable controller, or the like. Many of these replacement units require a power supply for the power control circuitry that must supply power to the control circuitry whether or not the load switching device is in the on-state or the off-state. The wiring that exists in the existing switch enclosures, the mechanical constraints imposed by the existing switch enclosures, and the constraints presented by the existing loads cannot be easily altered and must be tolerated by the unit that is replacing the existing switch.

Units that have been designed as replacement devices for existing switches range from simple dimmer switches to intelligent lighting systems with microprocessor control. Viable commercial products that may be used around the world in business, as well as in private locations, require replacement units that are low cost, robust, meet stringent safety considerations, are small in size, have low loss and have attractive physical features.

Existing load switches are either three-wire, or two-wire systems. Three-wire systems require hot, load and safety ground wires, whereas two-wire systems require only hot and load wires. In three-wire systems, although not required for proper operation, a line voltage potential is present within the switch enclosure whether the contacts of the switch are open or closed, while in a two-wire system, voltage is present within the switch enclosure when the contacts of the switch are open, but no voltage or a very reduced voltage is present when the contacts of the switch are closed. In addition, three-wire systems usually place constraints on the amount of current that may flow in the safety ground. For two-wire systems, the safety ground is not required for operation but there are constraints on the amount of current carried by the load wire when the contacts of the switch are open. It is desirable to provide a power system useable in either a two-wire or three-wire system, with little if any circuit changes.

With two and three-wire systems, supplying more than 15 mA to the switch control electronics when the switch contacts are open while at the same time limiting current to the load to less than 3mA has been difficult to achieve in a very small package size.

FIG. 1 is a simple illustration of prior art two-wire and three-wire systems and a wall switch enclosure through which a source AC voltage 1 and a load 2 have been wired.

In a two-wire system, the wall switch enclosure 37 has only the two wires hot conductor 3 and load conductor 4, while in a three-wire system, safety ground 38 also appears within enclosure 37.

There presently exist many two-wire load switch replacement units. Most of these units add a transformer primary winding in series with the relay contacts so a portion of the input power may be extracted by magnetic coupling to a secondary winding. The inserted winding adds a voltage insertion drop in series with the load whenever it is conducting load current. Since it is undesirable to reduce the voltage available to a load in most instances, designs in this class try to keep the insertion voltage drop to a minimum. If the voltage drop is small with respect to the line voltage, and thus the current that flows in the primary winding of the inserted transformer is not dependent to a large extent on the inductance of the primary nor the reflected impedance from the secondary when loaded, the primary may be said to be driven by the load current.

The transformers used to derive power while the load is energized have a low insertion voltage requirement for the primary dictated by Ldi/dt; where L is the inductance of the primary and di/dt is the time rate of change of the input current. Ldi/dt is insertion voltage and as such should be low enough when di/dt is large to not appreciably affect the operation of the load and large enough when di/dt is small to provide adequate power transfer to the secondary. Therefore, limiting the inductance L of the primary and providing adequate turns ratio so the secondary voltage is compatible with the selected regulator type is what dictates the transformer constraints. The di/dt term is determined by the frequency of the source line voltage and the load current. Prior art has been directed to a transformer that does not appreciably affect the current to the load. Among other disadvantages of these prior approaches, these devices have typically been too large to fit the strict size requirements for replacement switches.

It would be preferable for the replacement device's contacts to emulate the simple mechanical air gap switch it replaced. The replacement device should also have a similar voltage drop when the contacts are closed, essentially zero leakage current when the contacts are open, and a guarantee of safety from hazardous voltages when the contacts are open. Prior devices do not provide all of these desirable advantages.

SUMMARY OF THE INVENTION

The present invention solves the above-noted failings of the prior art by providing a power system for an electrical load switch, and an electrical load switch incorporating the power system, which replaces the simple mechanical contacts of a wall switch with those elements necessary to power control circuitry, provide controllable contacts, ensure thermal stability in a wall switch enclosure, control the off-state leakage current to ensure safe and robust operation of sensitive loads, and provide a safety device to guarantee that a no leakage off-state exists that protects a maintenance person from voltage potential with respect to neutral during load replacement.

The present invention provides an improved power system for a two-wire or three-wire wall switch replacement unit that handles high current loads, operates over a wide input voltage range, is compatible with most lighting systems, is robust, and safe. The power system of the present invention also has a good power factor, low EMI, and low losses, when the load switch is in the off-state.

More specifically, the invention contemplates a controllable electrical switch for selectively connecting a load to a source of electrical current, the switch including a controllable switching device having a conducting state and a non-conducting state, that operates to selectively connect the source of electrical current to the load, a switching regulator having an input connected to said switching device and having an output providing a regulated voltage supply, and a switch controller. connected to and powered by the regulated voltage supply output of the switching regulator, for controlling the controllable switching device. In a two-wire circuit, the switching regulator is connected across the switching device to the hot and load conductors. In a three-wire system, the switching regulator is connected between the hot conductor and safety ground.

The invention may also include a transformer having a primary winding and a secondary winding, the primary winding being connected in series with the controllable switching device and the secondary being connected to supply the regulated output voltage when the switching device is in the conducting state.

The output of the switching regulator may have an energy storage capacitor for filtering the regulated output voltage, and a post regulator may be connected to the output of the energy storage capacitor, to provide the regulated output voltage.

The present invention may also include first and second zero crossing detection circuits for detecting when the source of electrical current through the switching device crosses zero when the controllable switching device is in the conducting state, and for detecting when the voltage across the switching device crosses zero when the controllable switching device is in the non-conducting state, respectively. Then the switch controller controls the controllable switching device based upon zero crossings detected by said first and second zero crossing detection circuits.

The switching regulator used in the present invention preferably has an input power factor of at least 0.6, and most preferably at least 0.9. Further, the switching regulator used in the present invention may take many forms, including, for example, a step down switching regulator circuit, a buck regulator or a flyback regulator. In addition, the switching regulator preferably accepts input voltages in the range of 8 volts to 440 volts.

These and other features and advantages of the present invention will become apparent to those of ordinary skill in this art with reference to the drawings and following detailed description.

BRIEF DESCRIPTION OF THE DRAWINGS

FIGS. 13a–c are waveforms of the transformer 12 output voltages under various loads.

DETAILED DESCRIPTION

The present invention is directed to power systems for electrical load switches including devices that may be inserted in place of a common mechanical wall switch which is used to control the flow of current to a load from an AC line voltage source.

The present invention may be used to replace the contacts of switch 36 (FIG. 1) with electrical circuit components that include a switching device for connecting the load 2 to the input line voltage 1, as well as circuits for generating regulated power to operate a controller for the switching device. The replacement switching device has two operating states; it is either on and conducting (on-state) or off and not conducting (off-state). The device for generating regulated power must operate in these two states of the switching device. In the present disclosure, power derived when the load is energized is called on-state power and power derived when the load is de-energized is called off-state power. The replacement switching device for connecting an AC load may be either a relay or one of many solid state switching devices. A latching relay will be used as the replacement switching device for the remainder of this disclosure with the understanding that other switching devices such as SCRs, triacs, FETs and transistors could be used with corresponding compatible driver circuitry, without departing from the scope of the invention.

Figure 2:
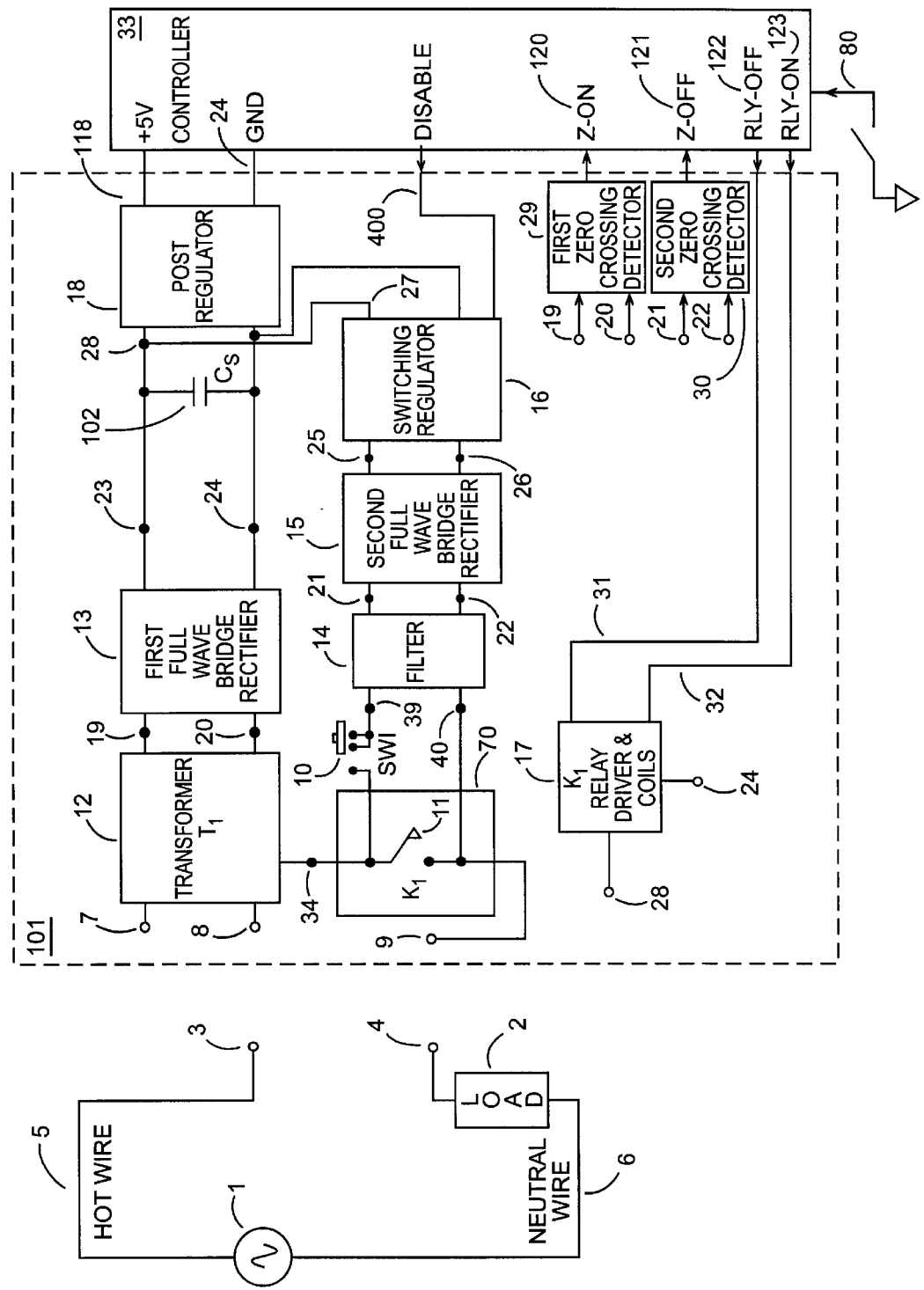
FIG. 2 is a block diagram of an exemplary embodiment of the power system and electrical load switch of the present invention.

The power system 101 of the present invention is illustrated in FIG. 2 and includes power inputs 7, 8, and 9 which may be connected to the two hot conductor 3 and load conductor 4 depending on the operating power level. Power inputs 7, 8 and 9 may be used to connect to the load in a pre-existing wall switch, or may be used to connect into a newly constructed circuit. Power system 101 produces a low power output 118 (illustrated as +5V) referenced to a circuit ground 24. The power system 101 receives or sends logic signals used to control the selective energization and de-energization of a load. In the illustrative embodiment, these logic signals are: 120 (Z-on), 121 (Z-off), 122 (Rly-off), 123 (Rly-on), and 400 (Disable). The logic signals are sent to and received from power control circuitry 33 used, in a known manner, to control the replacement contacts 11 of latching relay 70. Power control circuitry 33 may be of any known type and may include a microprocessor or microcontroller. Power control circuitry 33 may operate to selectively control the activation of contacts 11 by use of any known motion sensing technology including, for example, passive infrared (PIR), ultrasonic, microwave and acoustic, to name but a few, or combinations of two or more of these technologies. Controller 33 may also activate LED's (not shown) to indicate motion detection, and may also have mechanical switches used to initiate controller operation for example to over ride the sensing technology in order to power or unpower the load, to reset the controller, or the like.

Figure 3A:
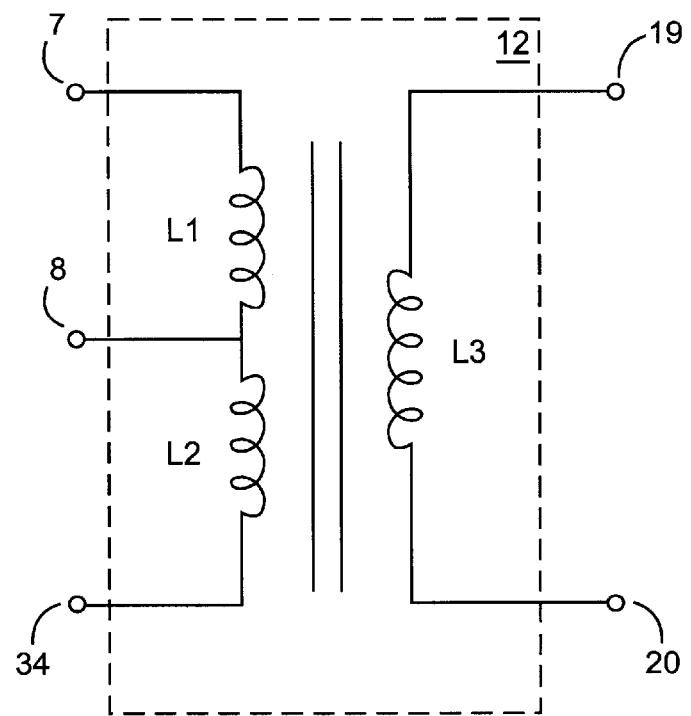
FIGS. 3a–3b are schematics of the input transformer used in the embodiment of FIG. 2.
Figure 3B:
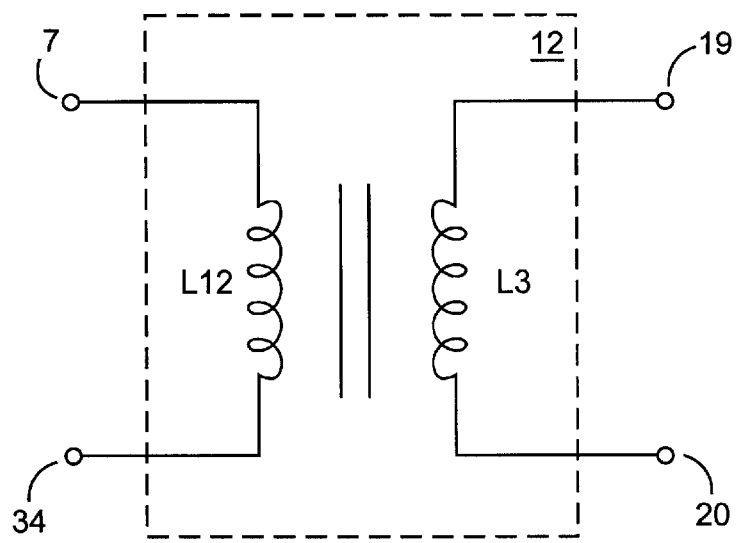

Different embodiments of transformer 12 are shown in FIGS. 3*a* and 3*b*. FIG. 3*a* is a tapped transformer primary. The single primary winding transformer of FIG. 3*b* may be used if care is exercised in providing a single winding with the characteristics of the tapped primary of FIG. 3*a*.

Figure 1:
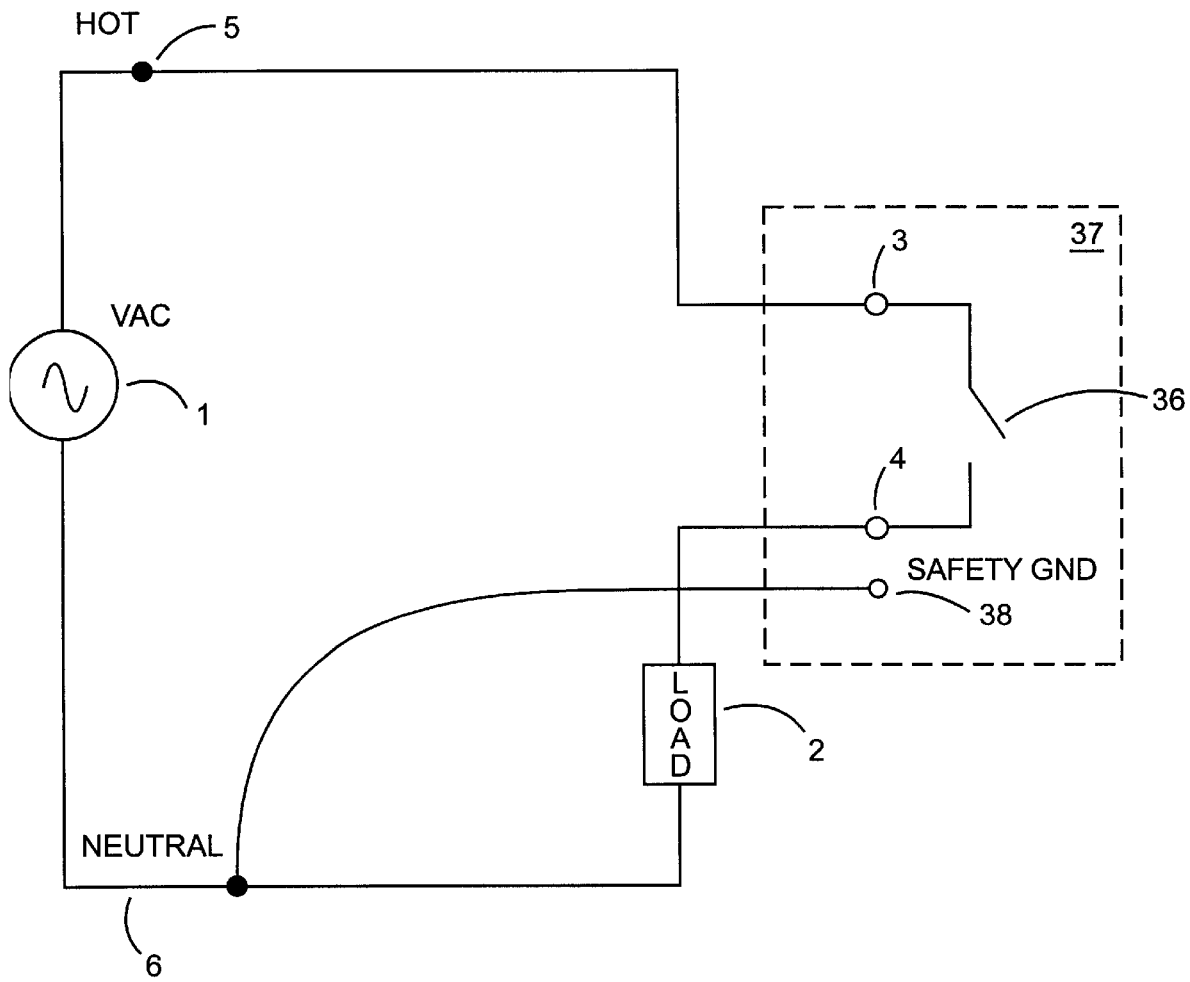
FIG. 1 is a prior art AC voltage source and load.

The tapped transformer primary windings shown in FIG. 2 and the contacts 11 of latching relay 70 replace the mechanical contacts of a pre-existing switch (for example, 36, FIG. 1). One side of the load is connected to load conductor 4 and conductor 4 is connected to one side of the replacement contacts 11 via terminal 9. The hot conductor 3 is connected to the hot wire 5 of the input voltage 1. During installation, hot conductor 3 is connected to either terminal 7 or terminal 8 depending on the load current range.

The power system 101 has two modes of operation, a first mode when contacts 11 are open and a second mode when contacts 11 are closed. When input voltage 1 is activated after the replacement unit is installed, the latching relay 70 is either on or off. If the contacts 11 are closed then current will flow through the primary windings of T1 and the load 2. The magnitude of the current will depend on the impedance of the load and the voltage of the input voltage 1.

The transformer 12 is effective only when the contacts 11 are closed, and power system 101 operates in the first mode. The primary winding of transformer 12 is in series with the contacts 11 and should have a low resistive voltage drop to keep the insertion losses low and a minimum reactive voltage drop to least affect the voltage at the load. Because of the limited ability of a typical wall switch enclosure to dissipate heat, it is desirable to keep the losses low. The insertion losses are maximum at maximum current. The reactive voltage drop is dictated by how many primary turns of transformer 12 are required so that at minimum current the transformer 12, secondary power is enough to power the power control circuitry 33. In accordance with one exemplary embodiment of the present invention it is desired that the secondary of the transformer produce about 150 mW. In wall switch replacement power systems there are opposing requirements for keeping the number of input transformer primary turns low to limit resistive losses and for keeping the number of turns high enough to generate on-state power while also not producing too much reactive voltage drop to affect the load voltage. These opposing requirements for the transformer 12 are met by carefully designing the transformer windings, core cross-section and core material.

One illustrative embodiment of the transformer 12 has a primary with two windings labeled L1 and L2 as shown in FIG. 3*a*. The winding L2 is the high power winding and the series combination of L1 and L2 is the low power winding. The appropriate connection to 7 or 8 is made at installation time. In the illustrative embodiment, the transformer winding L2 is designed to have 21 turns of six strands of 28 gauge wire connected in parallel. Foil windings may be used to achieve the low resistance of this primary winding but cost may dictate the use of parallel wires. In the low current range, winding L1 adds 43 turns of single strand 28 gauge wire in series with winding L2. Wire resistance, which affects the insertion loss, is low for winding L2 and higher for the combination of L1 and L2 in series. There may be additional losses that are attributable to core losses. The two primary winding configurations in the exemplary embodiment are designed for current ranges of 0.2A rms. to 2.0A rms. with L1 and L2 connected in series and 1.6A rms. to 5A rms. with L2 alone. The range that is connected at installation depends on the maximum current, power or variability of the load. For example, when powering a lighting system, one may have several fixtures in parallel that determines the entire load and one of these loads may be lost because of failure. The number of turns in the primary determines how low the load current may go while still permitting the power supply to power the control circuitry 33. If the range is selected without consideration, then the loss of a fixture in the high current range may drop the load current such that transformer 12 may not have enough turns to generate adequate on-state power. In the illustrative embodiment, transformer 12 has a secondary winding of 325 turns of 36 gauge wire.

A transformer 12 that provides adequate output voltage and current at the lowest possible input conditions would naturally generate significantly higher output voltage when the input current is high. This high output voltage may create difficult output regulator design problems. In the illustrative embodiment, the cross-section of the magnetic transformer core and the magnetic material for transformer 12 have been selected to give a high non-saturating flux level consistent with keeping the transformer a small size and low cost. In this way the smallest number of turns may be used to give the maximum output at minimum input. As the current through the transformer increases above the minimum necessary for low input current operation the transformer may saturate. Since the transformer 12 may be designed to give the desired output at the minimum input current, higher current will also deliver adequate power. However when the current during a half cycle exceeds the minimum saturation of magnetic core of transformer 12, saturation causes transformer action to collapse and thus limits the power output. The only insertion loss under these conditions is the result of the resistance of the primary wire, to a minor extent the resistance of the secondary wire, and magnetostrictive losses. The inductance of the primary is in fact maximized for the minimum current case and the wire resistance is minimized for the high input current range. Over an input range the transformer 12 may saturate and if so losses are minimized to manage the heat generated in the wall switch enclosure over the wide load power range. In an exemplary embodiment of the present invention the magnetic core material is M6 silicon steel. The transformer 12 of the present invention may handle a current range of 0.2 to 5 Amperes rms while minimizing thermal losses and guaranteeing 100 mW regulated low voltage output of the post regulator 18.

A problem that can occur when a 50/60 Hz transformer is allowed to saturate is the development of audible noise created by magnetostrictive forces causing motion of the transformer laminates. This is especially true when the transformer is inexpensive and the laminations are magnetic steel plates. Because a system incorporating the present invention may be used in quiet environments such as offices, libraries, or study areas, the production of audible noise may be considered a distraction or annoyance and therefore unacceptable. To solve this problem the transformer cores are usually vacuum impregnated with a polymeric material to dampen and cushion the mechanical motion of the laminates.

Figure 12:
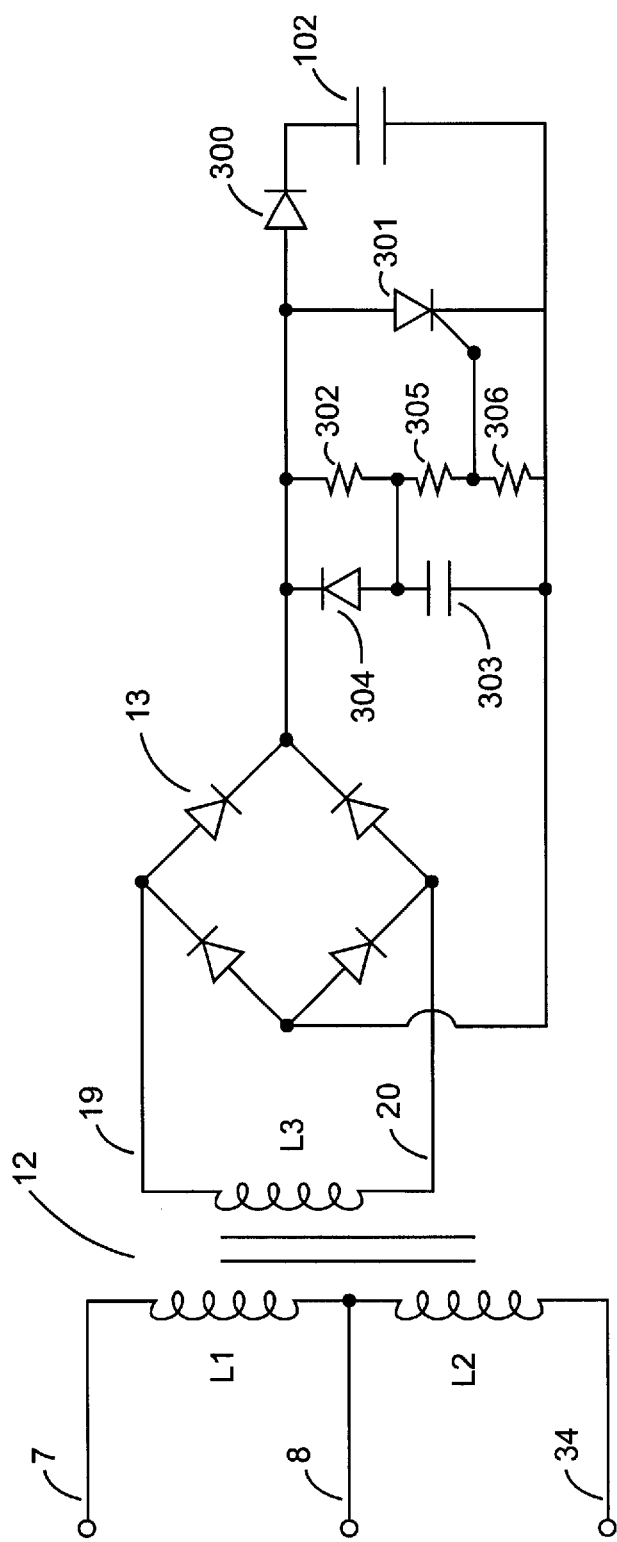
FIG. 12 is a transformer saturation limiting circuit useable in the present invention.

FIG. 12 shows a circuit for reducing the audible noise in transformer 12 by preventing the core of transformer 12 from saturating. When a load current flows through at least one of the primary windings L1 and L2 of transformer 12, a voltage is developed across winding L3 that is rectified by full-wave rectifier bridge 13. Other known full-wave rectifier circuits could also be used. Transformer 12 operates as a current transformer, so the rectified voltage increases until diode 300 begins conducting. At this point, energy storage capacitor 102 is charged by the energy delivered through transformer 12. Large values of load currents can cause the core of transformer 12 to reach a flux density level sufficient to cause saturation. This is undesirable, because reaching core saturation causes audible noise and increases core losses. The peak-to-peak flux excursion in a transformer core is proportional to the value of the time integral of the voltage present across any transformer winding integrated over one half-cycle of the winding voltage. The value of this time integral is measured in volt-seconds. The circuit of FIG. 12 is designed to trigger SCR 301 before the volt-seconds reach the point where the core of transformer 12 saturates. The voltage across winding L3 is shorted out when SCR 301 is triggered, and this limits the volt-seconds across that winding in order to prevent core saturation. SCR 301 could be replaced by other types of controlled switches provided that appropriate drive circuitry is include so that the action of SCR 301 is emulated.

Capacitor 303 and resistors 302, 305, and 306 form a simple integrator circuit in which the voltage across resistor 306 is approximately proportional to the peak flux density in the core of transformer 12. By properly selecting the values of the components in the integrator circuit, SCR 301 will be triggered before the core of transformer 12 is saturated. The effective RC time constant of the integrator circuit is typically designed to have a value that is greater than the duration of one half-cycle of the AC line voltage.

Diode 304 discharges capacitor 303 when SCR 301 is triggered, thereby resetting the integrator circuit for the next half cycle of the AC line voltage. Blocking diode 300 prevents energy storage capacitor 102 from being discharged when SCR 301 fires. Diode 300 could be replaced by a transistor or other switched device that accomplishes the blocking function.

When the contacts 11 are open most of the input AC voltage 1 will be present across the open contacts, and power system 101 operates in the second mode (off-state). To extract power from the input source voltage 1 when the contacts are open requires current to flow and thus a "leakage current" is generated. Two conditions result from the addition of parallel circuitry around the open contacts 11. First, a voltage with respect to neutral is present at terminal 9 or load conductor 4 when the replacement unit is installed and the contacts 11 that replaced the switch are open, and second, some amount of current now flows through the load that would usually experience zero current when the contacts 11 are open.

In the first condition, voltage potential across the load may be eliminated by inserting a mechanical contact in series with the off-state power circuit. The mechanical switch 10 disconnects the off-state power circuitry and eliminates the parallel path around the main power contacts 11. The mechanical switch 10 has the only off-state indication on the wall unit and this enables the maintenance person to service the load when relay 70 has contacts 11 open. The second condition creates a potential problem with solid state, high efficiency electronic ballasts. These loads are sensitive to current flow during the off-state. Large leakage currents cause ballast circuitry to slowly charge and eventually trigger a turn-on cycle. This charged energy is quickly discharged in lamps causing lamps to flicker and then the cycle is repeated. Minimizing the off-state current to ensure the largest range of usable loads may require the off-state circuitry to have the following characteristics: first, high efficiency to reduce the average off-state current, and second, conversion circuitry that controls the peak amplitude of the off-state current.

The off-state voltage is high, therefore most of the input AC voltage will appear across the open contacts 11. The off state supply of the present invention is able to supply substantially more rms current to controller 33 than rms current through load 2.

Figure 15A:
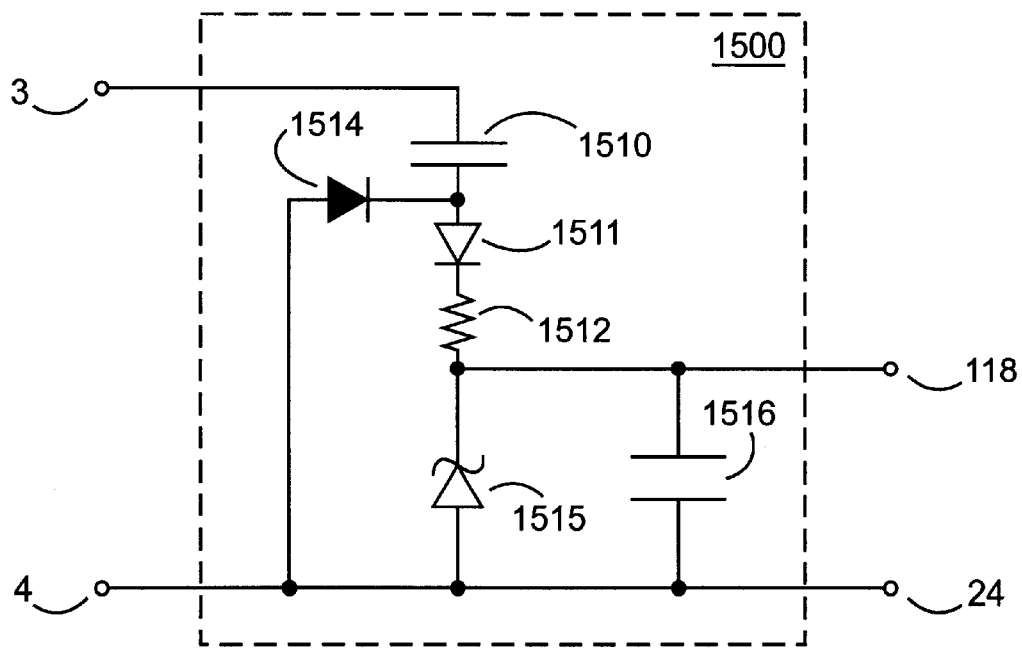
FIGS. 15a and 15b are examples of off-state power circuits
Figure 15B:
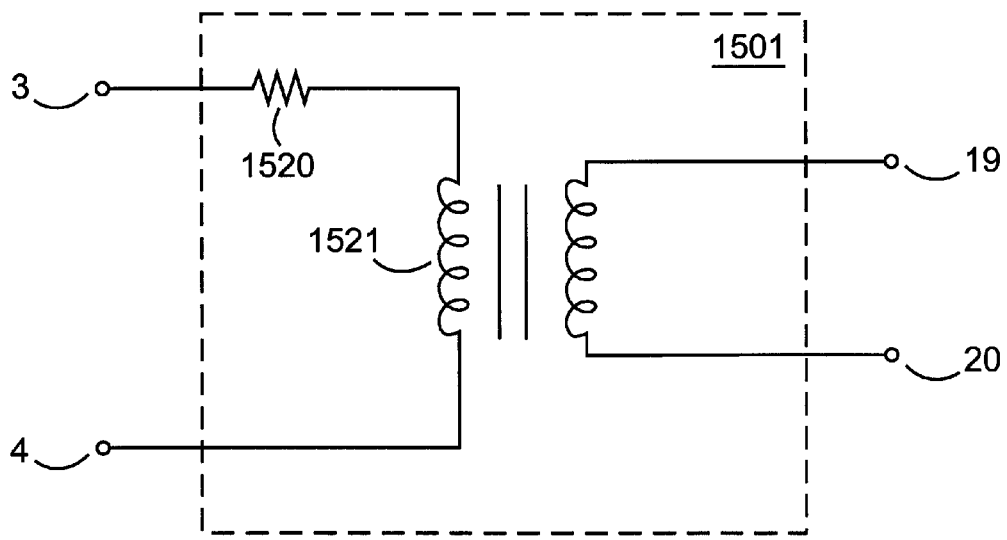

In contrast, prior approaches to supply off-state power are shown in FIGS. 15a and 15b. In FIG. 15a, 1500 is a circuit that generates off-state power using a halfwave rectified capacitor charging circuit. In FIG. 15a, off-state rms current supplied to controller 33 is approximately equal to the rms current supplied to load 2. In FIG. 15b, 1501 is another circuit that generates off-state power using a 60 Hz step down transformer 1521. In FIG. 15b, off state rms current supplied to the controller in this instance can be substantially greater than the rms current supplied to load 2.

The circuits of FIGS. 15a and 15b may only have good power factor and low peak currents only if their efficiencies are low. Resistors 1512 should be large and capacitor 1510 should be small to keep the power factor high. Either the value of resistor 1520 or the winding resistance of 1521 should be high to keep the power factor of FIG. 15b high. These high resistance values will result in undesirably poor efficiency. In addition, the line frequency transformer 1521 of circuit 1501 may be too large to meet packaging requirements.

The switching regulator design of the present invention meets the design requirements in a smaller package size than is possible with the line frequency transformer off-state design. This is primarily due to the smaller transformer possible with operation at the higher frequency. Further, a switching regulator will provide a higher ratio of controller current to load current.

The off-state power conversion circuitry needs to convert from a high voltage/low current to a low voltage/higher current dictated by the low voltage output power requirement. When the input voltage 1 is at its lowest operational level the off-state power regulator requires the highest input current for a given efficiency and output power delivered. The off-state circuitry typically operates over 80 to 310 volts rms range. There will be some voltage drop across the load in the off state. This embodiment of the off-state power regulator is intended for use in 120V to 277V rms line voltage applications. The illustrated embodiment allows for a 40V rms drop across the load in the off state by operating down to an input voltage of 80V rms and a maximum of 310V rms.

The off-state circuitry of the present invention is shown in FIG. 2 and comprises filter 14. full wave rectifier 15 and switching regulator 16. To minimize the reactance seen across the open contacts 11, the input circuitry to the switching regulator 16 has limited input capacitance and extracts energy from the input voltage 1 so the input voltage 1 and input current to switching regulator 16 exhibit a desirable power factor. Power factor is defined as (rms Volts)*(rms Amperes)/Watts. For a given rms input voltage to the switching power supply, and a given input power, having a high power factor minimizes the rms value of the input current to the power supply. Having a high power factor also implies that the current waveform is not excessively peaky, since having a peaky input current waveform, and holding input watts and input voltage constant would increase the rms current in comparison with an input current having the same shape as the input voltage. In the exemplary embodiment, switching regulator 16 has a large input power factor, for example, at least 0.6, and preferably at least 0.9.

Figure 8:
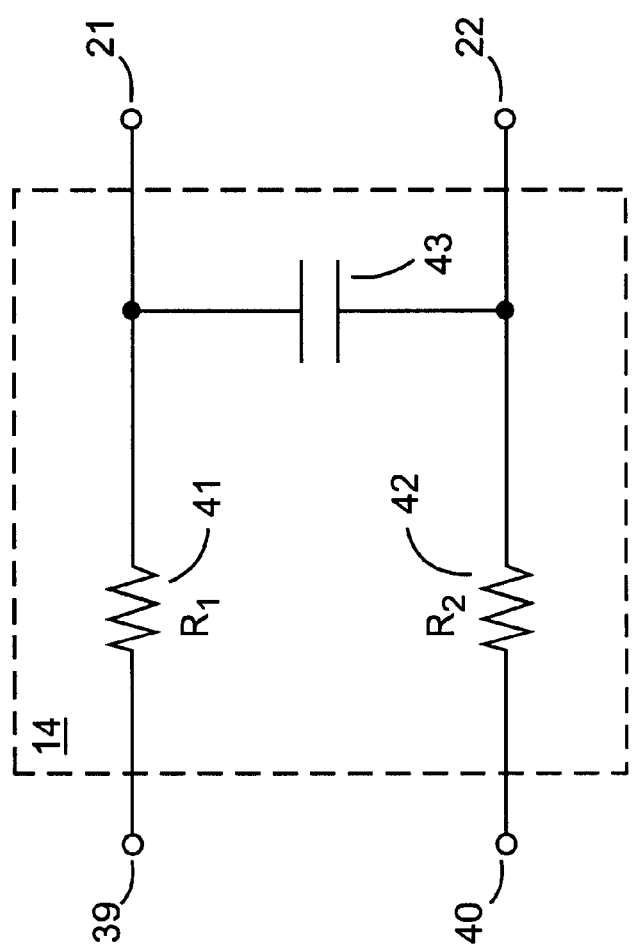
FIG. 8 is a schematic of the common mode filter on the input of the second fullwave bridge rectifier useable in the present invention.

To minimize the input capacitance of the full wave rectifier 15, no large output filter is used on its output and only a small capacitance, for example, 0.022 uf, is used on the input to the bridge circuit. This capacitor 43 is shown in FIG. 8 as the differential mode filter capacitor. Resistors 41 and 42 act in conjunction with capacitor 43 to provide both common mode and differential mode filtering. Capacitor 43 is in FIG. 8 as a differential mode capacitor. Resistors 41 and 42 provide common mode filtering function. Because the input current is small, these resistors may be sized large enough to provide significant attenuation without a large loss of efficiency. If the resistors are each sized at 1K ohm, this provides a 20 to 1 attenuation. If the input current is 3 mA rms, the sum of the losses in resistors 41 and 42 is 18 mW. The resistors provide a lower cost solution for common mode filtering than inductors, and may be purchased in a flame proof package to also act as an overload protection. To minimize the reactance of the input to the switching regulator 16 the regulator circuit must start to draw current early in the voltage cycle. Typically, the switching regulator should start when the full wave rectified voltage reaches approximately 8 volts and continue to operate over the remainder of a half cycle.

Figure 16A:
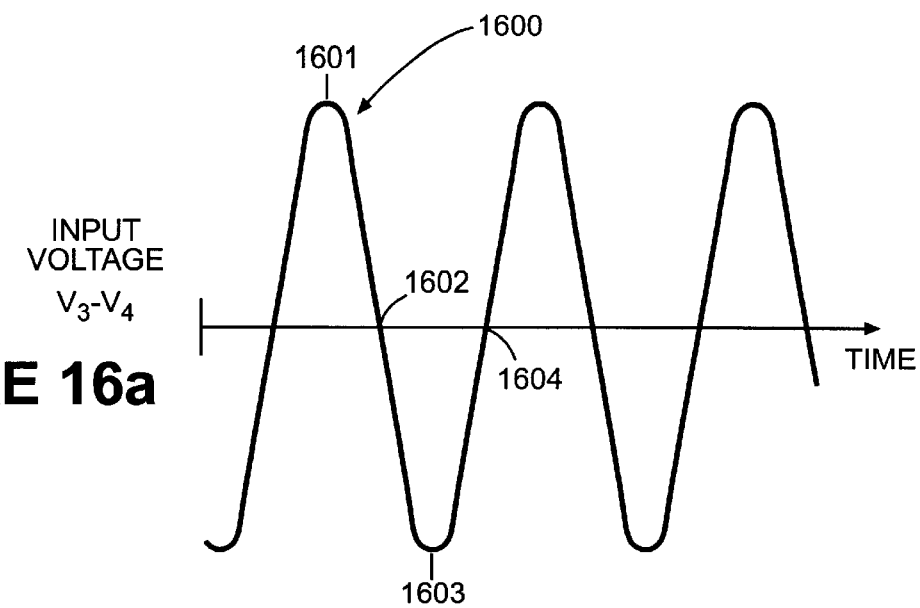
FIGS. 16a–c are graphs illustrating a poor power factor lights-off supply.
Figure 16B:
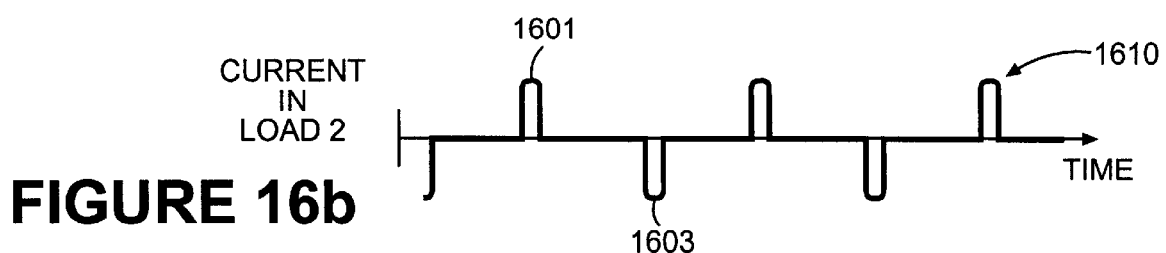
Figure 16C:
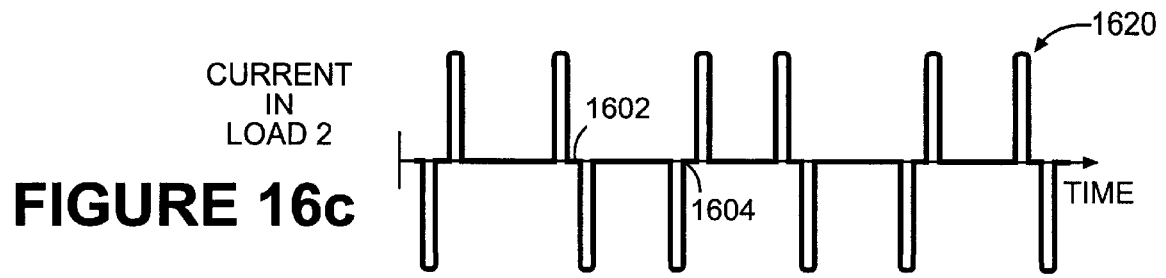
Figure 17A:
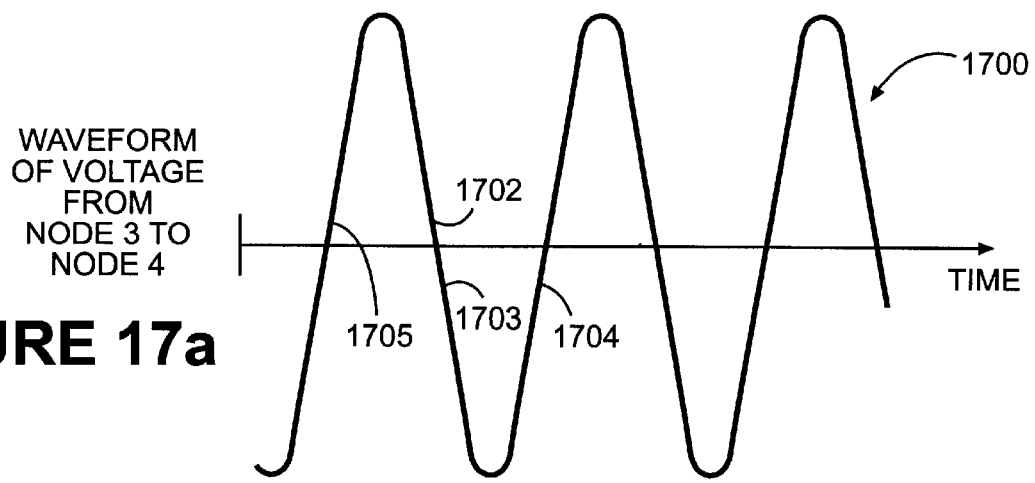
FIGS. 17a and 17b are graphs illustrating the desirable power of the present invention.
Figure 17B:
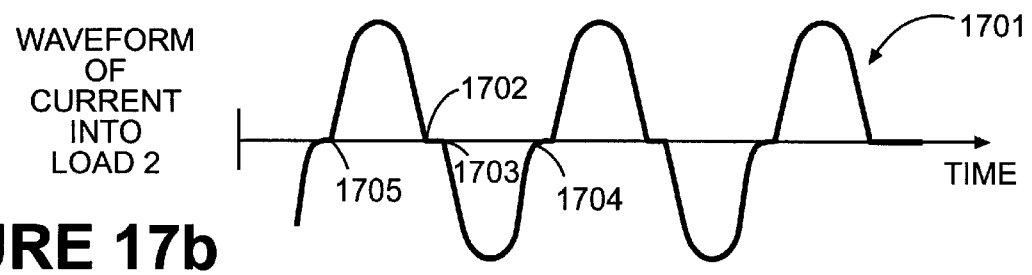

An important advantage of the off-state supply is conversion efficiency. For proper operation of many lighting loads, a sinusoidal like input current with a high power factor and a low rms value is required for off-state power. FIGS. 17a and 17b are graphs showing the input voltage 1700 and filtered current 1701 through the load in the off state for proper operation. In Contrast, FIGS. 16a, 16b and 16c are graphs showing two types of input current waveforms 1610 and 1620 possible for off-state power that can cause problems. FIG. 16b is a graph of the input current 1610 for a bridge rectifier with a large filter capacitor on the output. Most of the current is near the peak of the input voltage waveform 1601 and 1603. FIG. 16c is a graph of the input current waveform 1620 where most of the input current is in spikes near the beginning and end of each half cycle of the input voltage waveform 1602 and 1604. Although infrequent large current spikes as in 1610 and 1620 could provide equivalent power, this type of current can cause improper load operation. One example of improper load operation is tube flicker in the off-state with electronic ballasts.

The present invention has high power factor combined with low total harmonic distortion and very low peak input current. High power factor is achieved by low input capacitance and a low start-up voltage. These two factors require the switching regulator current to track the input voltage as shown in FIG. 17b. Small input capacitance allows filtering of high frequency with only a small leading contribution to the power factor. As the input voltage rises (1705), following a zero crossing the switching regulator starts operating in the range of from 8 to 22V. The switching regulator operates through the half cycle until the input voltage drops to 8 to 22V at time 1702. The switching regulator does not operate again until the negative half-cycle voltage reaches −8 to −22V at time 1703. The low turn on and off levels cause the switching regulator to draw current over most of each half cycle of the input voltage. This is important for achieving a good power factor. The switching regulator provides the advantages of variable input voltage and frequency in a smaller package than possible for the conventional line frequency design (shown in FIG. 15b).

Switching regulator 16 may be of any type of power circuitry that includes a controllable switching device used to switch current (for example a transistor, SCR, Triac, or the like) used in combination with one or more energy storage elements (an inductor or capacitor).

Figure 4A:
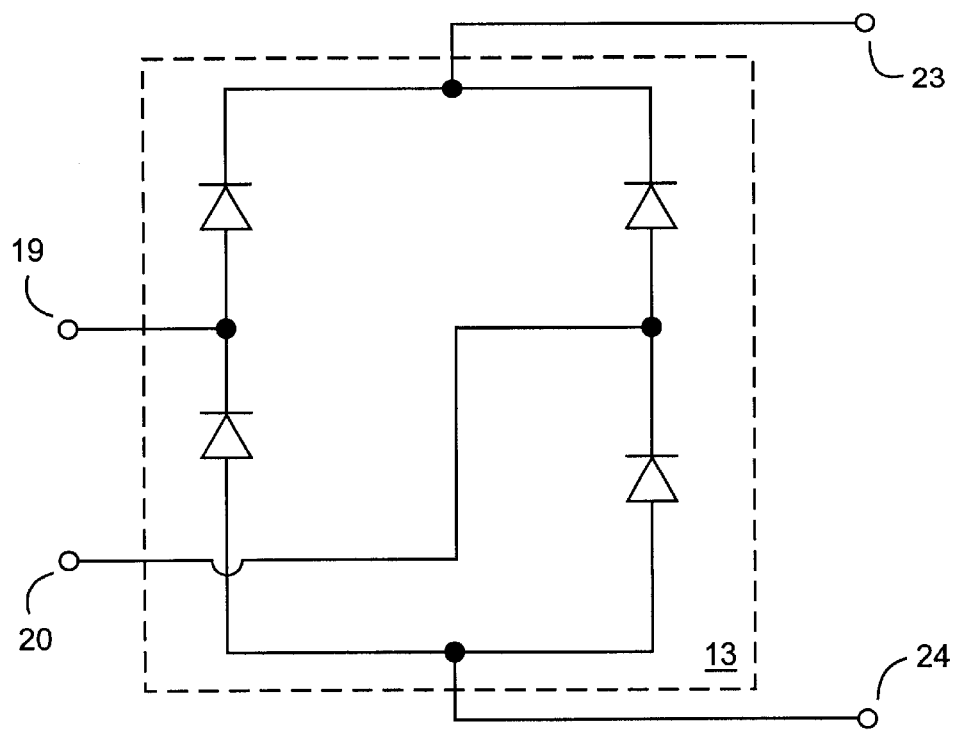
FIGS. 4a–4b are schematics of the first and second full wave bridge rectifiers used in the embodiment of FIG. 2.
Figure 4B:
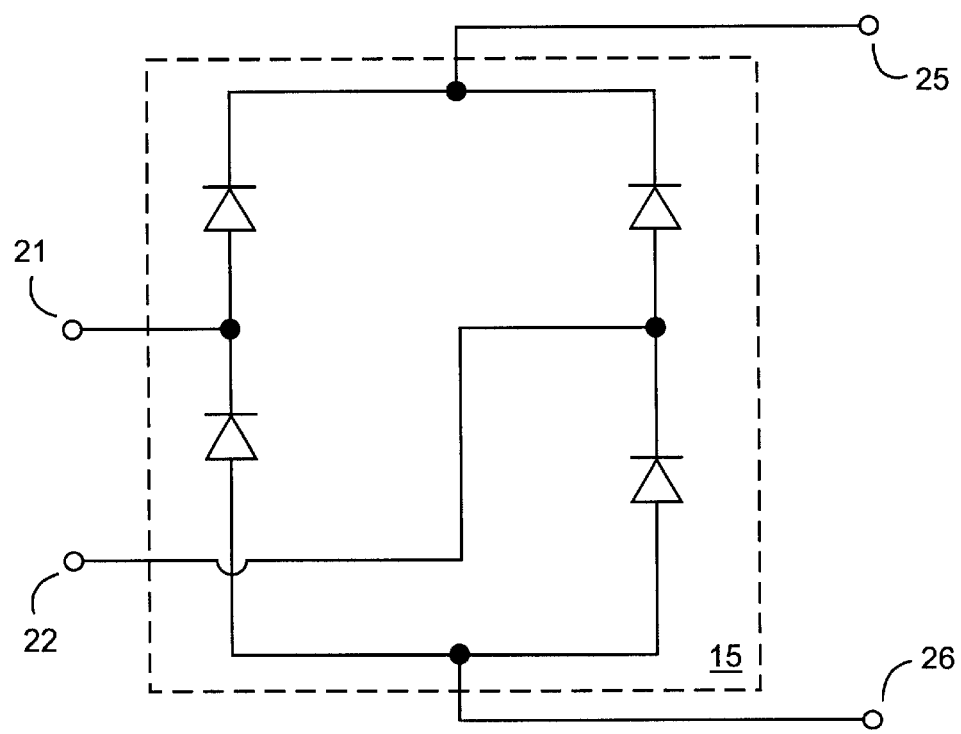
Figure 14A:
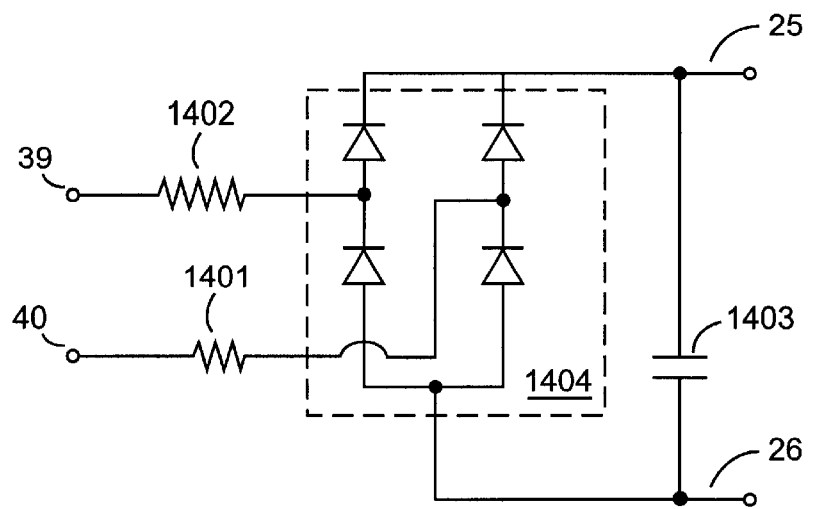
FIGS. 14a and 14b are examples of combination rectifier/filters that are useable in the present invention.

The filter 14 of FIG. 8 and the second full wave rectifier 15 of FIG. 4b may be combined as shown in FIG. 14a. If the rectifiers in the bridge and the capacitor 43 are chosen carefully, this has the benefit of allowing tighter layout of high frequency networks. In FIG. 14a, the resistors 1402 and 1401 connect points 39 and 40 to full wave rectifier bridge 1404. The output of full wave rectifier bridge 1404 is connected to capacitor 1403 and to points 25 and 26.

Figure 14B:
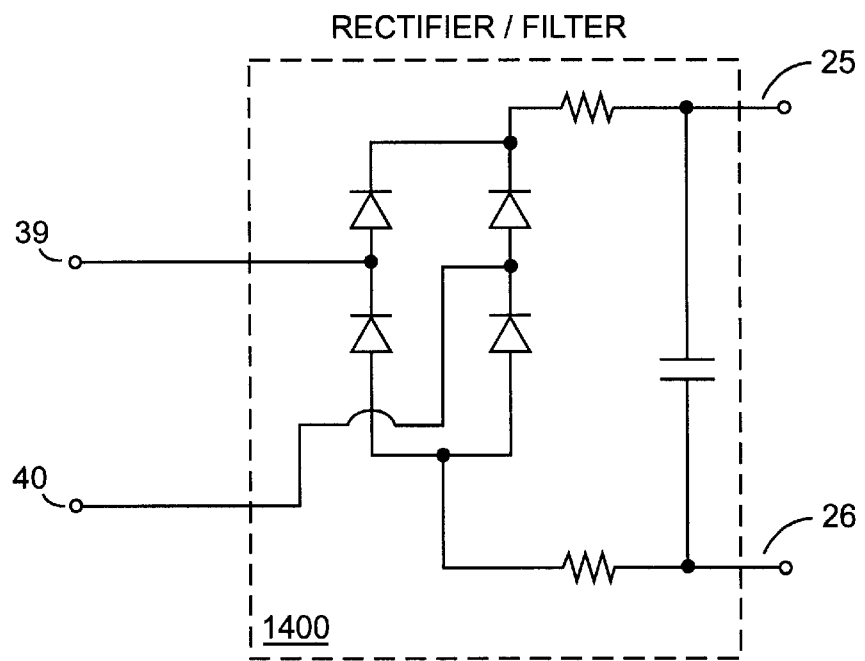

Alternatively, rectifier 15 and filter 14 may be transposed as in FIG. 14b. This results in the configuration of rectifier/filter functional block 1400.

Figure 6:
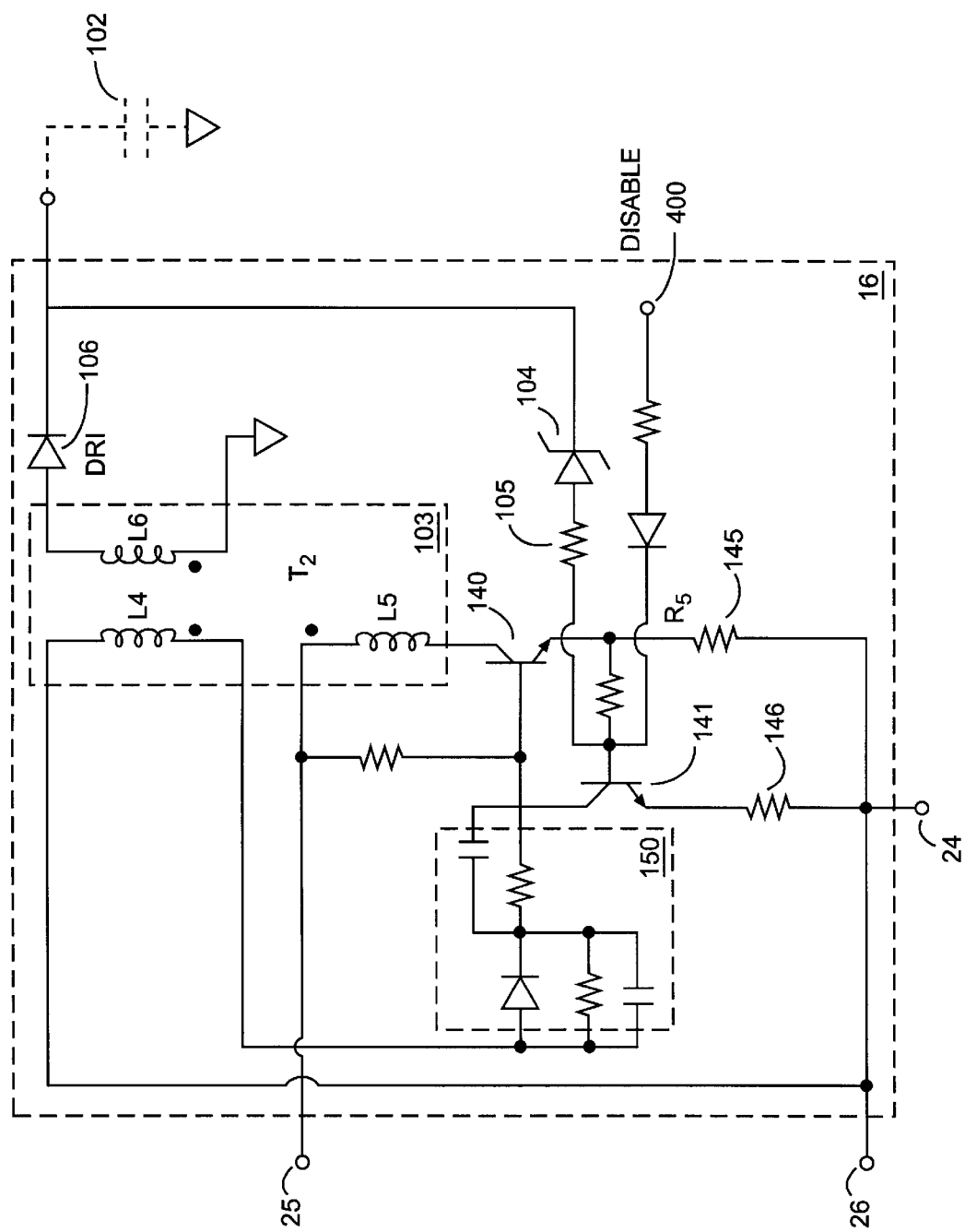
FIG. 6 is a schematic of an exemplary embodiment of a switching regulator circuit useable in the embodiment of FIG. 2.

FIG. 6 is an embodiment of switching regulator 16 useable in the present invention. The circuit for switching regulator 16 shown in FIG. 6 is of a fly back oscillator circuit topology. When transistor 140 is conducting, current builds up in transformer 103 primary winding L5. The coupling of the winding L6 is such that diode 106 is back biased the coupling of winding L4 via feedback network 150 further turns on transistor 140. When current in resistor 145 creates enough voltage to begin to reduce the base emitter voltage on transistor 140 a regenerative cycle starts. The transformer action of windings L4, L5, and L6 transfers energy to output 27 and L4 further turns off transistor 140. Transistor 140 remains off until the stored energy in the transformer 103 is transferred to the output 27. Output 27 is connected to a storage capacitor, in this disclosure it is capacitor 102. Zener diode 104 and resistor 105 form a series feedback that will conduct current when the output 27 exceeds the Zener voltage of diode 104. This current will turn on transistor 141 and limit the turn on of transistor 140 and thus causing less energy storage during a cycle of the regulator. The feedback path of diode 104 and resistor 105 produces a voltage regulation on output 27. In this embodiment, the pulse width and frequency of the switching regulator 16 change with input voltage.

In operation, as the voltage increases each half cycle when transistor 140 is on, the voltage across the winding L5 of T2 also increases. This has two main effects. The first is that the rate of change of the current in the fixed inductance primary winding L5 of T2 increases. This causes a more rapid rise of the voltage on resistor 145, which is in series with L5. The second effect is that the voltage on winding L4 of transformer T2 increases proportionally with voltage across L5. This raises the voltage at the base of transistor 140 higher through network 150. As the base voltage of transistor 140 increases, it takes more current through resistor 145 to turn off transistor 140. As current through resistor 145 increases, more energy is transferred to the output.

Figure 18A:
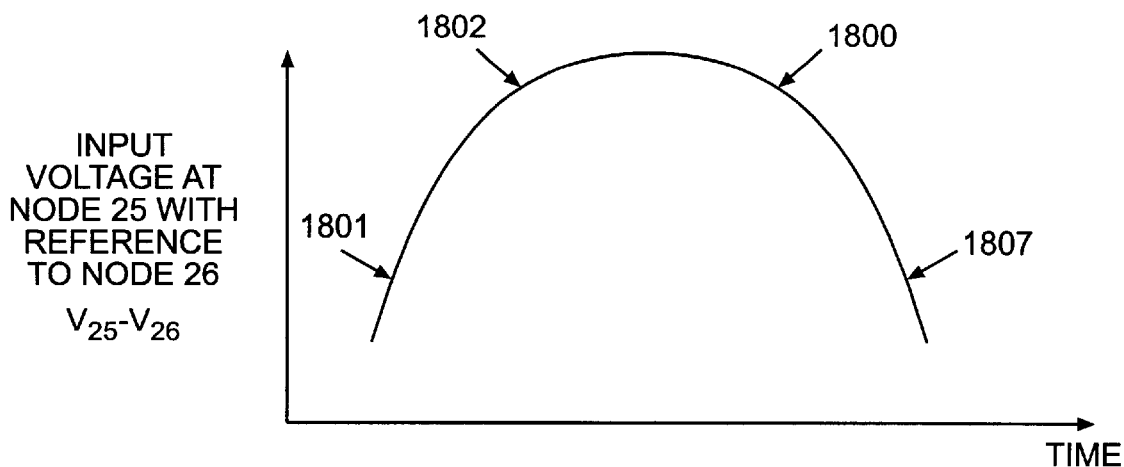
FIGS. 18a–c are graphs of the input current of an embodiment of the present invention.
Figure 18B:
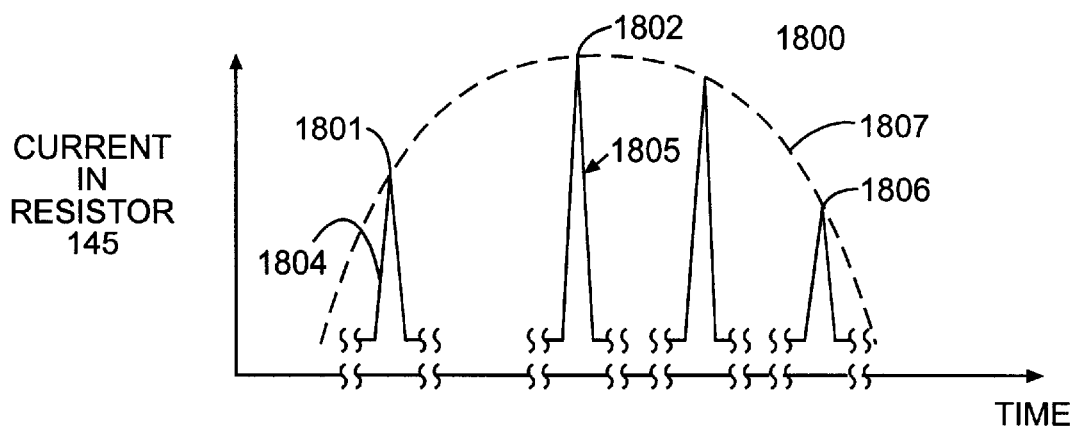
Figure 18C:
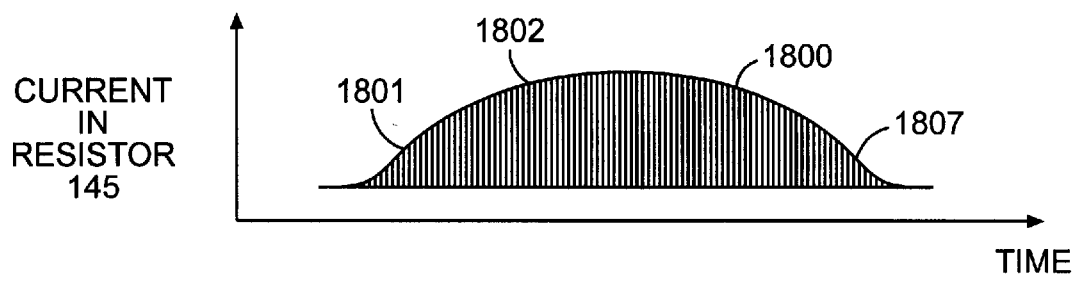

The graphs of FIGS. 18a, 18b and 18c respectively show the voltage of the output of full wave bridge rectifier 15 (25 with reference to 26), the filtered current into the supply during the same time, and expanded waveshapes of the current through resistor 145 of FIG. 6 at the points in time labeled on the bridge output. At point 1801, the current pulse, 1804, through resistor 145 is small because the voltage 1800 applied to the switching regulator, is small. As the voltage increases at 1802, the current pulse, 1805, has also increased. The current pulse magnitude continues to track the input voltage magnitude and decreases by point 1807 as seen by the magnitude of current pulse 1806. The averaging of these pulses by capacitor 43 of FIG. 8 produces the smooth sinusoidal like current waveshape shown in FIG. 18a, 1807. The present embodiment works well with 60 and 50 Hz line frequencies and DC input. Further, it is not limited to a narrow input voltage frequency range. It requires instead an input voltage within a rms voltage range and below a peak voltage limit. The input current is dependent on the input voltage and feedback from the filter cap 102 through Zener diode 104 and resistor 105. The input voltage frequency range that the converter will operate with is bounded on the high end by the one half of the switching converter operating frequency and on the low end by the load voltage hold up time provided by capacitor 102.

Continuing with the operation of the circuit of FIG. 6, the current feedback path through Zener diode 104 raises the bias point on transistor 141 when the voltage on capacitor 102 rises above the Zener turn-on voltage. This is either due to a reduction in the load power consumption or an increase of the rms input voltage, which causes more energy transfer to the load. Transistor 140 turns off quicker shortening the pulse of current through winding L5. If the load is very small, the current through diode 104 can be sufficient to lengthen the off time of transistor 140. Current into the base of transistor 141 either through Zener diode 104 and resistor 105, through a resistor and diode from an Output of controller 33, or some other current supply can be used to enable or disable the controller of FIG. 6.

As can be seen with reference to the input current graph, FIG. 18b, the switching regulator of FIG. 6 is a discontinuous current mode flyback converter. A discontinuous mode flyback converter is a good way to achieve a high power factor. As seen in FIGS. 18a, b and c, this topology causes the input current to track the input voltage and results in a good power factor.

Figure 19:
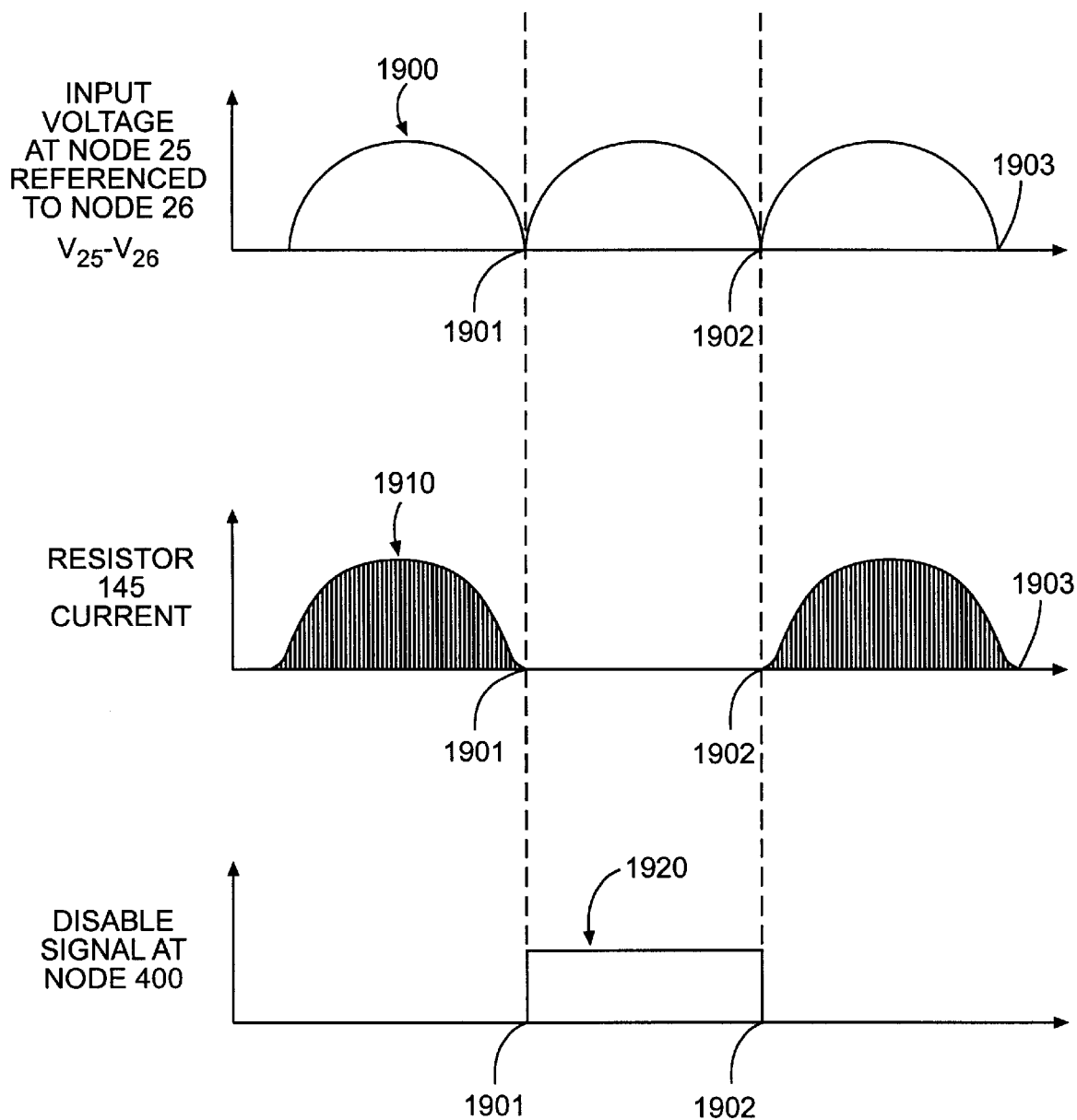
FIGS. 19 and 20 are graphs illustrating the disable feature of the present invention.
Figure 20:
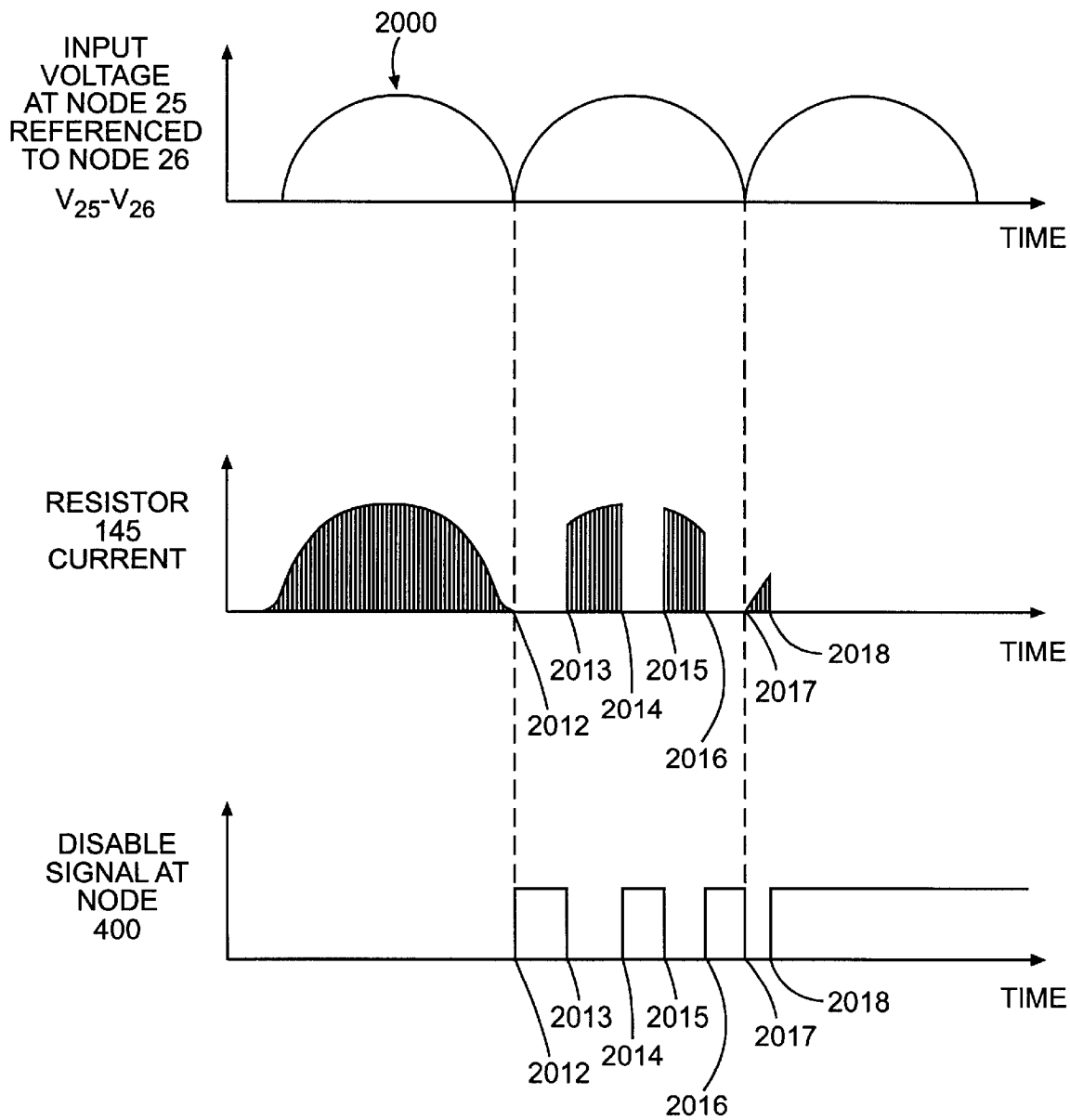

Referring once again to FIG. 6, as long as the base of transistor 141 is sufficiently biased, transistor 140 is prevented from turning on and in this manner the switching regulator may be turned off for a time period dictated by the controller. This disable function could be used to hold the converter off for low power operating modes or modulate the operation of the converter on and off at a frequency other than that of the supply voltage. This could be useful for shaping the input current or avoiding an operating frequency that could be a noise source for circuits used by controller 33. If for instance the 120 Hz of the bridge rectifier was an undesirable frequency or it was desired to not operate the switching regulator during part of the line cycle when power line communications took place, the Disable signal 400 could be used to change the operating times of the switching regulator. FIG. 19 and FIG. 20 show the Disable signal 400 from the controller, the output of the second full wave bridge rectifier 15 and the current through resistor 145. When the current through resistor 145 is essentially zero, the switching regulator is off. This is shown between times 1901 and 1902 in the graphs of FIG. 19. When the current through resistor 145 rises and falls within an envelope relative to the input voltage the switching regulator is operating. This is shown between times 1902 and 1903 of FIG. 19.

FIG. 20 is a collection of graphs showing the Disable signal switched high and low faster than the input voltage frequency. The switching regulator turns off at 2012 and back on at 2013. The turn off is repeated at points in time 2014, and 2016. The turn on is repeated at points in time 2015, and 2017.

By allowing both frequency and pulse width to vary the regulator operates over a wide input voltage range high efficiency. A more conventional switching regulator may also achieve the wide input voltage range with a fixed frequency and variable pulse width.

Figure 9:
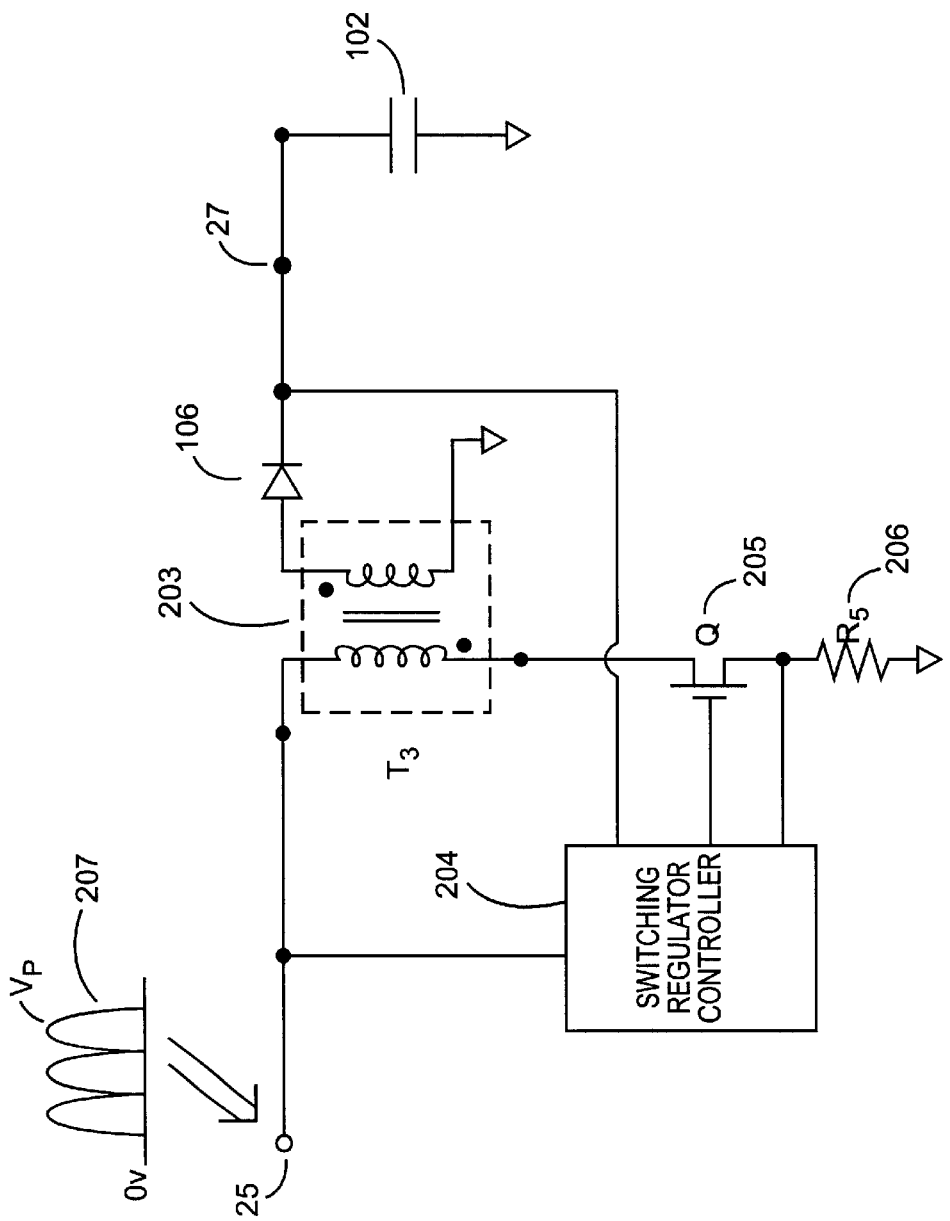
FIG. 9 is a schematic of a generalized buck switching regulator with transformer output coupling useable in the embodiment of FIG. 2.

FIG. 9 is a schematic of an alternate switching regulator 16 that may be used in the present invention. This particular switching regulator should except a full wave rectified voltage 207 as the input. Transformer 203 is a flyback transformer with only primary and secondary windings with proper coupling as shown. Diode 106 couples the high frequency current to the energy storage capacitor 102. FET transistor 205 is the main switching device and resistor 206 provides current feedback to the regulator controller 204. The output voltage 27 is fed back for voltage regulation. Although the details of regulator controller 204 are not included, single chip controllers for this topology commercially exist, including, for example, a type UCC 1804 available from Unitrode.

Other switching regulators 16 would also be useful in the present invention and could be used to replace the circuit of FIG. 6 or FIG. 9 without deviating from the concept, spirit and scope of the present invention. Alternate switching regulator circuits for the present invention would be satisfactory as long as the power factor is high, for example at least 0.6 and preferably 0.9, the rms. input current is low, for example, less than 5 mA, the input capacitance is low, for example, less than 0.022 uf, and the input voltage range is large, for example, 8 to 440 Vrms. The flyback blocking oscillator switching regulator topology shown in FIG. 6 achieves all the requirements for the off-state regulator necessary for the power system of the present invention, however, other configurations are also satisfactory.

Another feature of an illustrative embodiment of the present invention is the coupling of two energy sources into one common energy storage capacitor 102 on the input of a post regulator circuit 18. The on-state circuit uses the energy storage capacitor to filter 50/60 Hz current pulses of the first full wave rectifying circuit 13. The switching regulator diode 106 couples the high frequency current pulses from its output transformer 103 into the same energy storage capacitor 102. A post regulator 18, such as a known three terminal linear regulator, may provide the final regulation of the voltage on the common energy storage capacitor 102. The post regulator 18 may also be a switching regulator design without departing from the scope of the present invention.

The energy storage capacitor 102 by the action of the off-state or the on-state power circuitry stores a partially regulated supply voltage. This voltage is used as the input to a post regulator 18 and as the supply voltage 28 for the relay 70's coils 61 and 62 shown in FIG. 5a.

When the contacts 11 are open, the output voltage of transformer 12 goes to zero and the diodes in its bridge circuit 13 shown in FIG. 4a block any conduction back to the transformer 12 secondary when capacitor 102 charges via the output of the switching regulator 16. Likewise when the switch contacts 11 are closed, the input to the full wave rectifier 15 is shorted, the output of the switching regulator 16 goes to zero volts and diode 106 blocks conduction terminal 28 back to the output winding L6 of transformer 103.

Figure 5B:
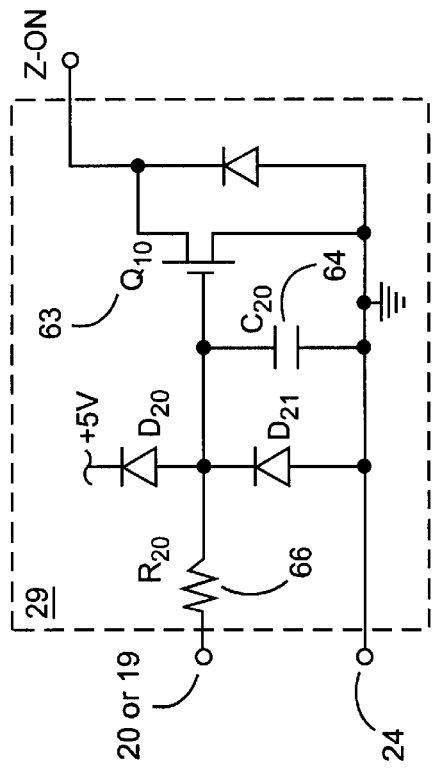
FIGS. 5b and 5c are schematics of the zero crossing detectors used in the embodiment of FIG. 2.
Figure 5C:
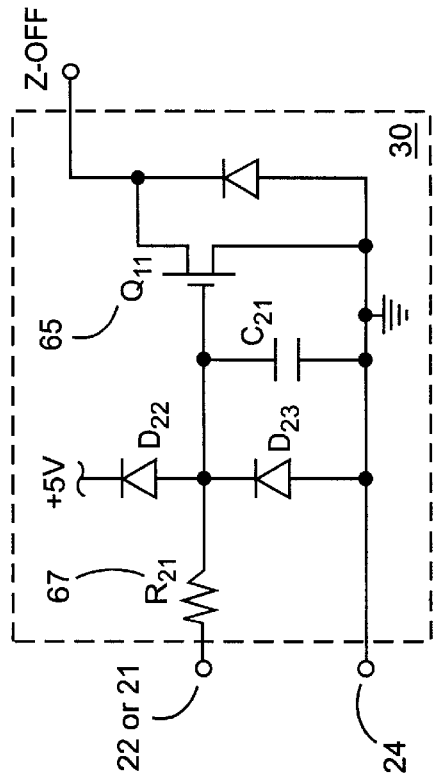
Figure 5A:
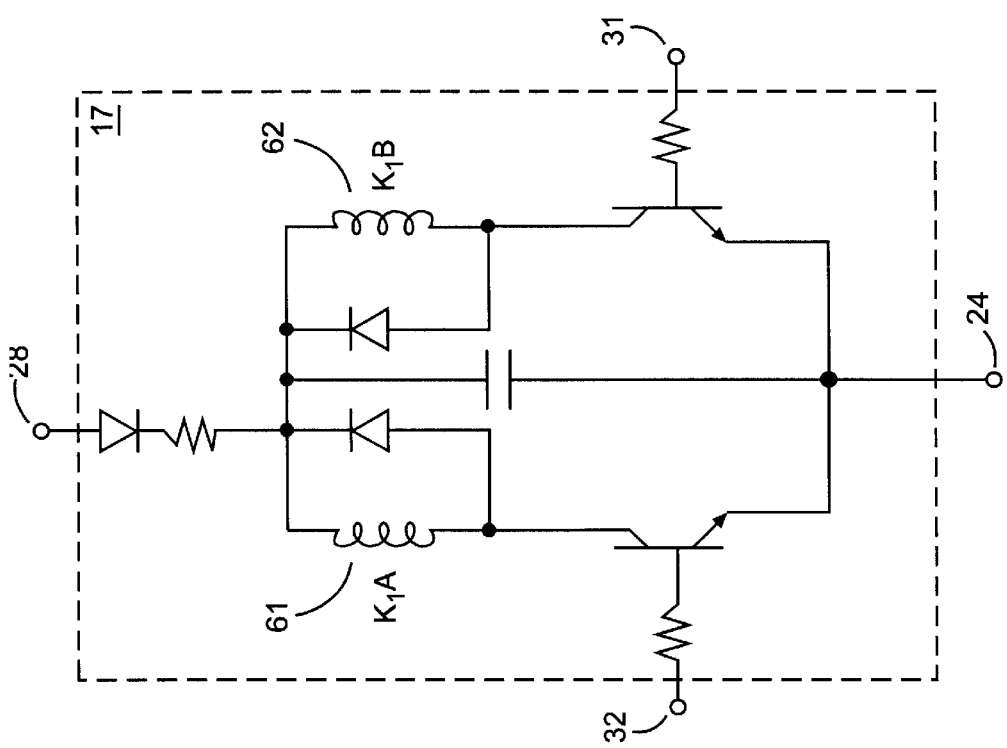
FIG. 5a is a schematic of the relay driver used in the embodiment of FIG. 2.

Since the off-state and the on-state circuits are isolated by the action of the relay contacts 11 and the diodes in their respective full wave bridge circuits, two separate circuits 29 and 30 shown in FIG. 5b and 5c may be used to function as zero crossing detection circuits that are fed by the inputs to the full wave rectifiers 13 and 15 respectively. FIG. 2 shows these two circuits with their connection to the controller 33. Circuit 29 detects when the current passing through contacts 11 of relay 70 in the on-state is close to zero, and circuit 30 detects when the voltage across contacts 11 of relay 70 in the off-state is close to zero. Circuits 29 and 30 generate outputs 120 and 121 as Z-on an Z-off. In circuit 29 the FET transistor 63 will be on and in the low impedance state whenever its input capacitor 64 is charged above its gate threshold voltage. A transition from the off to the on-state of FET 63 will indicate when the input of circuit 29 transitions through or near zero volts. Circuit 30 operates in a similar fashion on the off-state input voltage. The size of the resistors 66 and 67 in their respective circuits are set based on the magnitude of the expected input voltages. The two diodes on the gates of FET 63 and FET 65 clamp the gate voltages 1 diode drop above the regulated output voltage (+5V shown) and 1 diode drop below ground.

The output voltage of transformer 12 may change dramatically when transformer 12 has extreme input conditions of very high or very low current. FIGS. 13a through 13c show typical transformer 12 output voltages for various load currents. The pulse width produced when the output voltage from transformer 12 is the input to circuit 29 or 30 is an indication of the magnitude of the load current. The pulse width information is available on the zero crossing signal for the controller 33 to use. In cases where the load current is insufficient for normal operation, the controller 33 may enter a low power mode of operation and signal the user about the condition. The load current to a lighting system may drop as lamps enter end of life. If the controller 33 sensed a low power mode of operation where sufficient power may not be present to operate all of its sensors, it may disable its highest power sensor say the ultrasonic transmitter. Controller 33 would then use only the PIR or other low power sensor to determine occupancy until the condition is remedied. In cases where the load current is too large, the controller 33 may switch the load off and signal the user about the high current condition.

Calculated delay times are used when generating logic signals 122 and 123 to control relay driver coil 61 and 62 shown in FIG. 2. Having independent circuits to detect when the input voltage crosses zero allows these signals to be fed to control circuitry in the controller 33, typically a microprocessor, that may calculate independent turn on and turn off delays for the relay contacts 11 of latching relay 70. These delay times are fed back into the power system as logic signals 122 and 123 as shown in FIG. 2. Since the relay contacts 11 normally are used to control current to complex loads, this allows the power control circuitry 33 to open the contacts at near zero current and close the contacts at near zero voltage, and to prevent noise, current stress to the relay contacts 11 or for other functions. The controller 33 may also calculate a factor to account for the response time of the relay 70.

The input to the off-state full wave rectifier 15 is fed by a RC filter 14 configured as a common mode noise filter. Filter 14 reduces the amount of switching noise fed back onto the AC line. By keeping the capacitance 43 low, the filter 14 does not detract from the circuit function while reducing noise injected back on the line.

The input to full wave rectifier 15 is also connected via a mechanical air gap switch 10. Because the power supply draws current and provides a shunt path around contacts 11 that are open, the mechanical air gap eliminates leakage current when contacts 11 are open completely disconnecting the load. This is normally accomplished by separate high current contacts in series with the relay contacts 11 that must be sized to carry the maximum load current. The advantage of having the mechanical air gap switch only in series with the off-state power supply is that it enables using a small switch. The traditional air gap switches are in series with relay contacts 11 and are physically large to handle high load currents and line voltages up to 277 VAC.

Opening mechanical switch 10 does not immediately turn off or disconnect the load because the on-state power supply circuits may still be supplying voltage to post regulator 18 if a load is present. A separate, manual, open relay signal 80 is sent to the controller 33 which in turn sends a logic signal 31 to open relay contacts 11. With the mechanical air gap switch 10 open, the off-state power supply is now disconnected and voltage potential across the load is removed. If the separate, manual, open relay signal 80 is not sent to the controller, then it is possible for the relay 70 to be have closed contacts 11 and the load to itself be an open circuit. An example is a case of closed relay contacts where a lighting load burns out. The wall switch unit would have no power and no active indication would exist of the relays latched condition. A maintenance person would have to measure the voltage at the load to determine that the load was safe. If the relay was latched with closed contacts the hot wire to the load would have to be disabled at the breaker box. One feature of the present invention is a controller 33 that when operating with an on-state relay and having a load that burns out, the controller will execute a relay off command via signal 31 when the supply voltage drops below a set condition.

Figure 7:
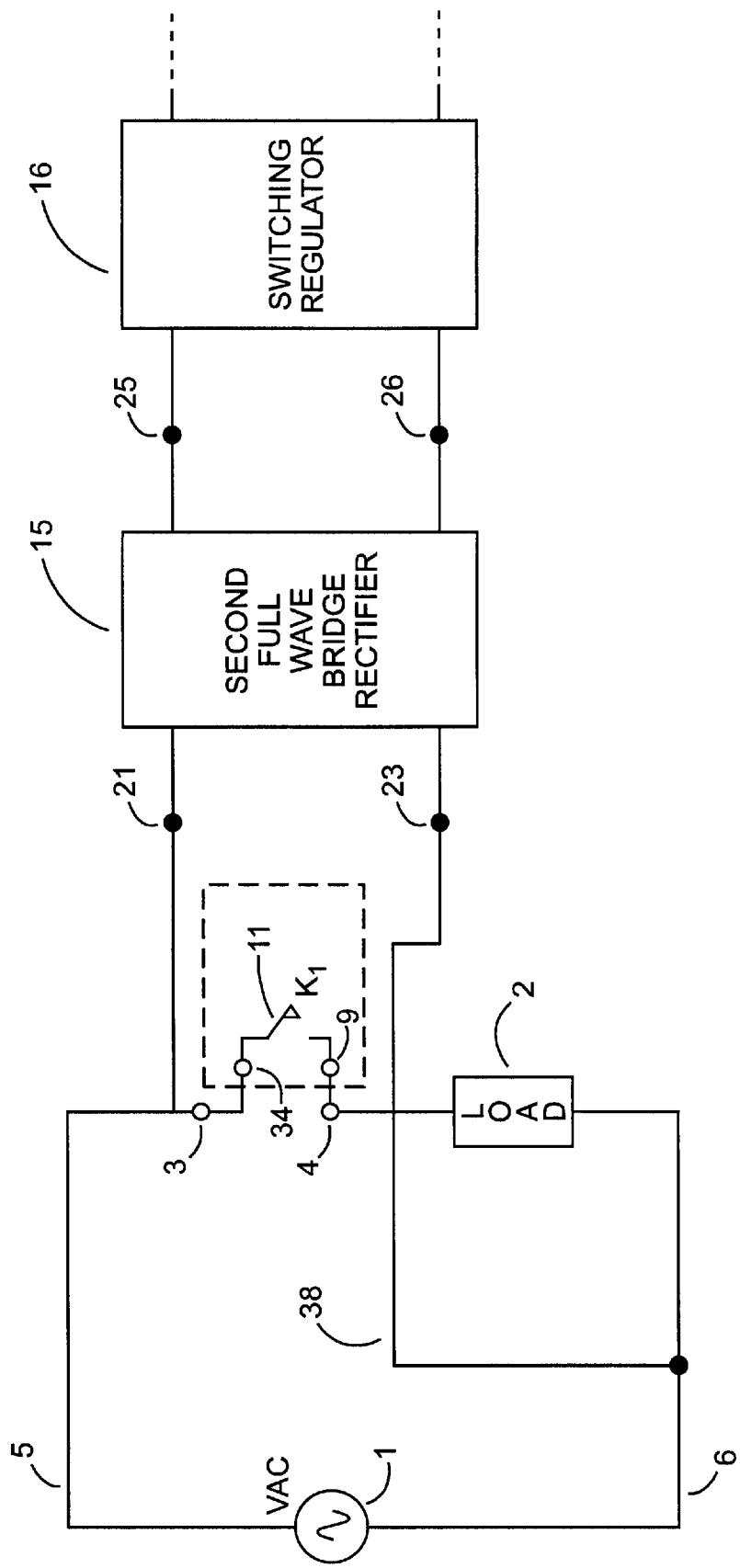
FIG. 7 is a schematic of an alternate embodiment of the present invention.

FIG. 7 is another embodiment of the invention employing the 3-wire system discussed earlier. In this embodiment, the transformer 12 in series with the switching device that connects the load is eliminated because it is not necessary. The safety ground or possibly the load conductor may be present to provide a current return path for the power system when the switching device is open or closed. The most important and frequently encountered case is the one where the safety ground is present inside the wall switch enclosure. The current returned through this wire is preferably low, for example, below 0.5 mA rms. to meet Underwriter's Laboratory requirements. The input to the full wave bridge rectifier 15 and the switching regulator 16 previously used across the open contacts 11 are now used across the hot wire 3 to the safety ground 38. Applications for the power system in this configuration normally requires less regulated power than the 2-wire case. The minimum value of input voltage 1 for the wall replacement unit product and the 0.5 mA of allowed current in the ground will limit the maximum possible output power. Switching regulator 16 and the design of the bridge rectifier circuit 15 with no large AC filter capacitor on the output of the bridge rectifier ensures that the current returned to the safety ground may be designed to meet the 0.5 mA rms requirement by limiting the output power and also ensures that large spikes of current are not present when the diodes of bridge rectifier 15 conduct.

Figure 10:
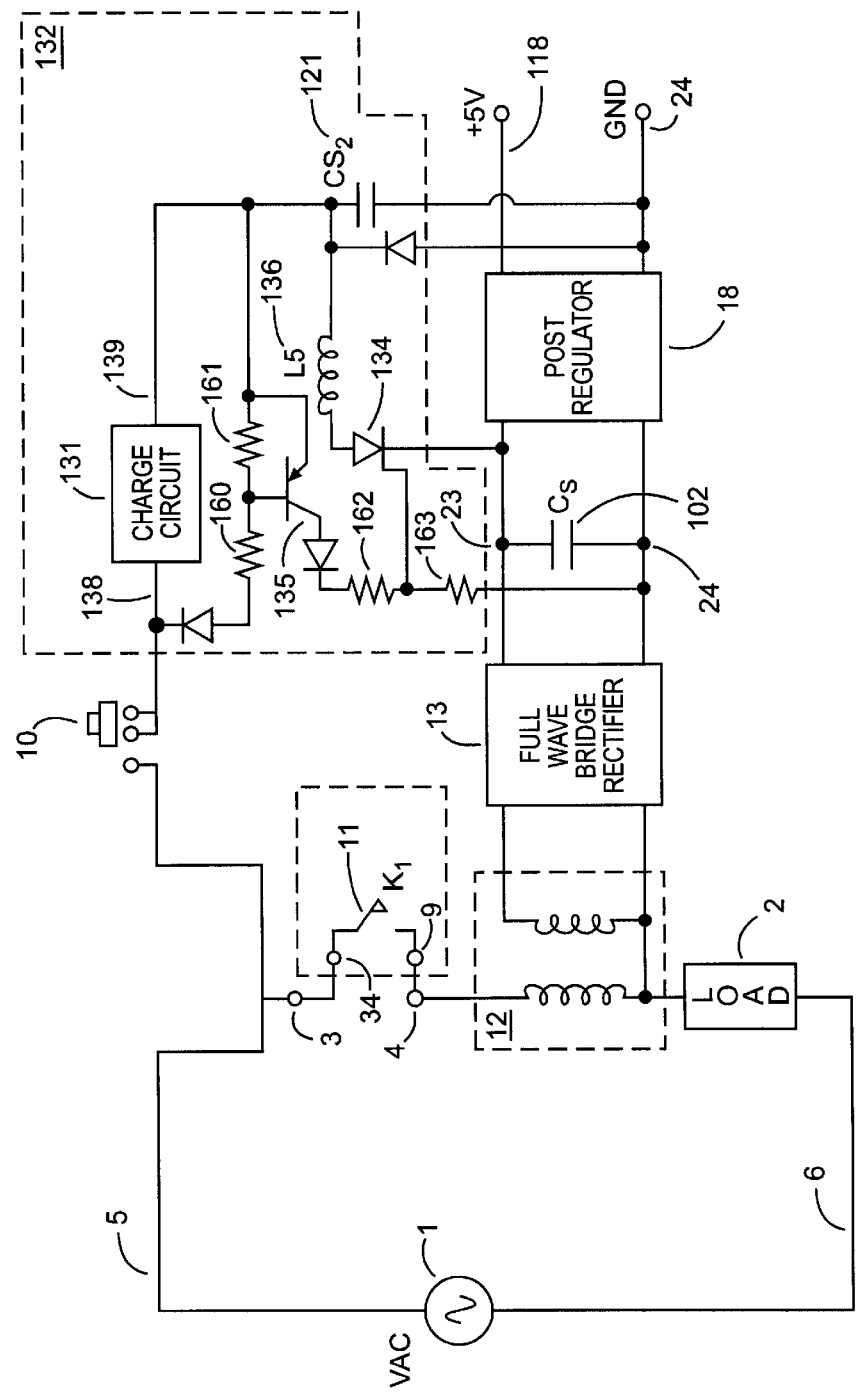
FIG. 10 is an alternate switching regulator embodiment of the present invention.

FIG. 10 is yet another embodiment of a switching regulator used to generate off-state power in accordance with the present invention. Circuit 132 is a buck-type switching regulator and operates at a switching frequency of 60 Hz. and has low losses normally associated with high frequency switching regulators. The active devices are either on in saturation or off. The main elements of this circuit are the charge circuit 131 and the energy transfer circuit composed of SCR 134 and inductor 136. The on-state circuitry with the transformer 12 primary winding in series with the load remains the same as discussed above with reference to FIG.

2. Transformer 12 shown in FIG. 10 with a single primary may also have a tapped primary as discussed in other embodiments. Also as in previous embodiments the off-state and on-state circuits use a common energy storage capacitor 102 on the input to the post regulator 18.

Figure 11A:
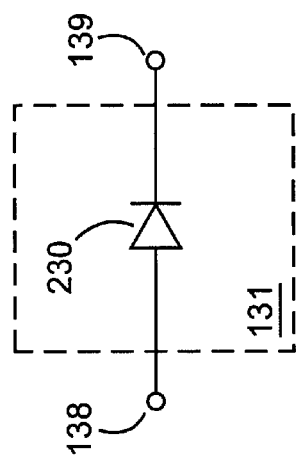
FIGS. 11a–11c are various charge circuits for the switching regulator in FIG. 10.

Referring to FIG. 10, when relay contacts 11 are open and voltage supply 1 has a positive potential from line 5 to line 6 and the mechanical air gap switch 10 is closed the charge circuit 131 will charge the small high voltage capacitor 121. In the simplest implementation the charge circuit 131 may be a diode 230 shown in FIG. 11*a*. On the positive half cycle of voltage 1 the diode is conducting and capacitor 121 has a voltage that tracks voltage 1 to its peak value. As the voltage 1 starts dropping from its peak the diode 230 reverse biases and capacitor 121 holds the peak of voltage 1. As the input 138 to the charge circuit 131 approaches 0 volts, the voltage divider formed by resistors 160 and 161 are such that transistor 135 turns on. A voltage pulse is generated on the gate of SCR 134 by the current from transistor 135 and resistors 162 and 163. SCR 134 fires and the capacitor 121 discharges through inductor 136 and transfers its energy by charging capacitor 102. During the transfer cycle SCR 134 is on and has a low voltage drop. The inductor 136 and the capacitor 121 form a resonant circuit and will attempt a sinusoidal cycle. When the inductor current in 136 tries to reverse, the SCR 134 will turn off, preventing capacitor 102 from discharging back through inductor 136. Since the active devices in the charge and energy transfer circuits are either on or off and never in a linear state this circuit is a switching regulator whose switching frequency is dictated by the frequency of the line voltage. Capacitors 121 is sized relative to capacitor 102 to guarantee adequate energy transfer during each half cycle of the line voltage.

Figure 11B:
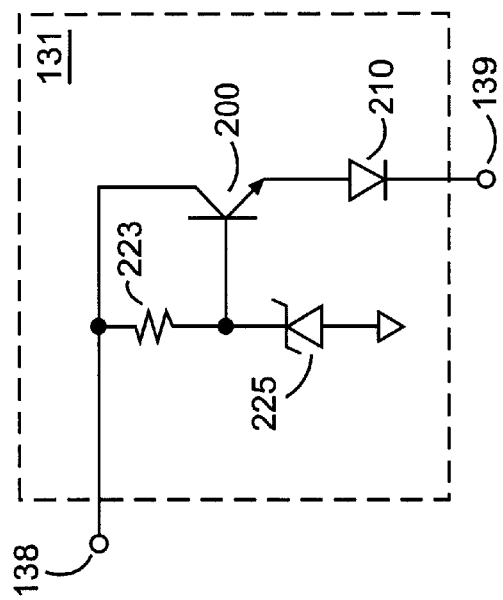

FIG. 11*b* is another embodiment of the charging circuit 131 which may be used when the input voltage 1 has wide variations. The simple diode circuit 131 in FIG. 11*a* will charge the capacitor 121 to the peak of input voltage 1 and as voltage 1 varies the energy stored on capacitor 121 will vary altering the energy transferred to capacitor 102. If the energy taken by post regulator 18 is not high enough, the voltage on capacitor 102 will increase and a way to dissipate the excess energy would be needed across capacitor 102, for example a Zener diode clamp.

Figure 11C:
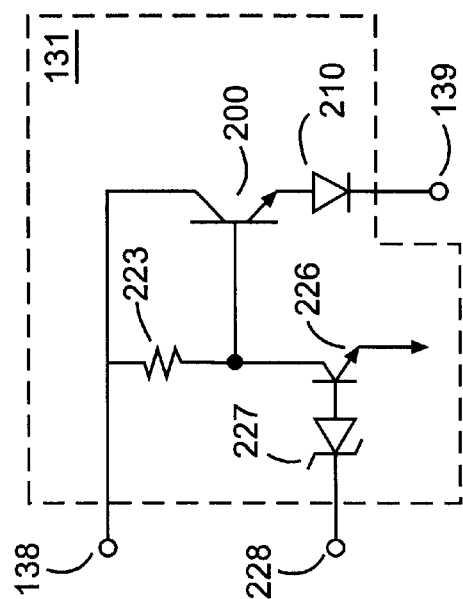

Another embodiment of charging circuit 131 is shown in FIG. 11*b* and includes a charge clamp circuit using transistor 200, resistor 223 and Zener diode 225. In this embodiment, as the input 138 goes positive the transistor 200 turns on to saturation and the capacitor 121 charges toward the peak of input voltage 1. However, when the input voltage 1 reaches the breakdown voltage of Zener diode 225 the base of transistor 200 is clamped and the voltage rise on capacitor 121 stops at a known fixed value. FIG. 11*c* is yet another embodiment of a charge circuit 131 where transistor 226 and Zener 227 form a feedback circuit to node 23 on capacitor 102. In this embodiment, if the voltage on capacitor 102 exceeds the breakdown voltage of Zener diode 227 transistor 226 will turn on limiting the voltage to which capacitor 121 can charge. The circuit of FIG. 11*c* forms a dynamic clamp that will track the requirements of the post regulator 18. Other circuits for the charge path of capacitor 121 can be designed without departing from the scope of the present disclosure. Other semiconductor devices, for example an FET, may be substituted for transistors 200, 226 or 135 without departing from the scope of the low frequency switching regulator 132 of FIG. 10.

The present invention has been described with reference to specific exemplary embodiments which have been offered as illustrative, and should not be considered to limit the invention. It will be understood by those of skill in this art that deletions, additions and changes may be made to theses exemplary embodiments without departing from the spirit or scope of the invention.

What is claimed is:

1. A controllable electrical switch for selectively connecting a load to a source of electrical current, comprising:

a controllable switching device having a conducting state and a non-conducting state, for selectively connecting the source of electrical current to the load;

a switching regulator having an input connected to said switching device and having an output providing a regulated voltage supply, the switching regulator drawing a current proportional to a voltage applied thereto; and a switch controllers, connected to and powered by said output of said switching regulator, for controlling said controllable switching device.

2. The controllable electrical switch of claim 1, further comprising:

a transformer having a primary winding and a secondary winding, said primary winding being connected in series with said controllable switching device, said switching regulator being connected to supply said regulated output voltage when said switching device is in the non-conducting state, and said secondary winding being connected to supply said regulated output voltage when said switching device is in the conducting state.

3. The controllable electrical switch of claim 2, further comprising:

a rectifier circuit connected to said secondary of said transformer, and having a rectifier output;

an integrator for providing a voltage substantially proportional to a time integral of a voltage at said rectifier output; and a controllable switch operable to selectively short-circuit said rectifier output when said voltage substantially proportional to said time integral exceeds a predetermined maximum.

4. The controllable electrical switch of claim 2, said transformer having a split primary including a plurality of primary windings.

5. The controllable electrical switch of claim 2, further comprising a first rectifying device connected across said secondary winding of the transformer, the output of the first rectifying device being connected to an energy storage capacitor.

6. The controllable electrical switch of claim 5, further comprising a second rectifying device connected between said switching device and said input to said switching regulator.

7. The controllable electrical switch of claim 1, further comprising an energy storage capacitor connected across said output of said switching regulator for filtering said regulated output voltage.

8. The controllable electrical switch of claim 7, further comprising a post regulator connected to said output of said energy storage capacitor, to further regulate said regulated output voltage.

9. The controllable electrical switch of claim 1, further comprising a post regulator connected to said output of said switching regulator, to further regulate said regulated output voltage.

10. The controllable electrical switch of claim 1, further comprising:

a first zero crossing detection circuit for detecting when a current passing through said controllable switching device crosses zero when the controllable switching device is in the conducting state;

a second zero crossing detection circuit for detecting when a voltage across said controllable switching crosses zero when the controllable switching device is in the non-conducting state; and said switch controller controlling said controllable switching device based upon zero crossings detected by said first and second zero crossing detection circuits.

11. The controllable electrical switch of claim 10, said switch controller changing said controllable switching device from said conducting state to said non-conducting state substantially simultaneously with detection of zero crossing by said first zero crossing detector.

12. The controllable electrical switch of claim 10, said switch controller changing said controllable switching device from said non-conducting state to said conducting state substantially simultaneously with detection of zero crossing by said second zero crossing detector.

13. The controllable electrical switch of claim 1, said switching regulator comprising a step down switching regulator circuit.

14. The controllable electrical switch of claim 13, said switching regulator having a switching frequency above 20 KHz.

15. The controllable electrical switch of claim 13, wherein the step down switching regulator circuit is a flyback converter.

16. The controllable electrical switch of claim 15, wherein the step down switching regulator circuit is a discontinuous current mode flyback converter.

17. The controllable electrical switch of claim 1, wherein the switching regulator has an input power factor of at least 0.6.

18. The controllable electrical switch of claim 17, wherein the switching regulator has an input power factor of at least 0.9.

19. The controllable electrical switch of claim 1, wherein the switching regulator accepts input voltages in the range of 8 volts to 440 volts rms.

20. The controllable electrical switch of claim 1, further comprising:

an energy storage capacitor coupled to the output of said switching regulator; and a post regulator coupled to said energy storage capacitor.

21. The controllable electrical switch of claim 1, wherein the controllable switching device is a single pole single throw latching relay that has at least one pair of contacts connected in series with the source of electrical current and the load.

22. The controllable electrical switch of claim 1, wherein the controllable switching device comprises at least one FET connected singly or in parallel.

23. The controllable electrical switch of claim 1, wherein the controllable switching device comprises at least one SCR connected singly or in parallel.

24. The controllable electrical switch of claim 1, wherein the controllable switching device comprises at least one Triac connected singly or in parallel.

25. The controllable electrical switch of claim 1, wherein the controllable switching device comprises at least one transistor connected singly or in parallel.

26. The controllable electrical switch of claim 20, wherein the post regulator is a low drop out linear regulator.

27. The controllable electrical switch of claim 20, wherein the post regulator is a switching regulator.

28. The controllable electrical switch of claim 10, further comprising:

a transformer having a primary winding and a secondary winding, said primary winding being connected in series with said controllable switching device, said switching regulator being connected to supply said regulated output voltage when said switching device is in the non-conducting state, and said secondary winding being connected to supply said regulated output voltage when said switching device is in the conducting state;

wherein the input to said first zero crossing detection circuit is connected to the secondary of the transformer.

29. The controllable electrical switch of claim 10, wherein the input to said second zero crossing detection circuit is connected to the input of said switching regulator.

30. The controllable electrical switch of claim 10, said switch controller detecting under-load and over-load conditions based upon outputs of said first and second zero crossing detection circuits.

31. The controllable electrical switch of claim 1, further comprising:

a manual over-ride switch, connected between said controllable switching device and said switching regulator, and operable to disable said switching regulator.

32. The controllable electrical switch of claim 1, said switch controller selectively activating and deactivating said switching regulator.

33. The controllable electrical switch of claim 2, further comprising:

a transformer saturation detection circuit connected to said secondary of said transformer and operable to detect and minimize saturation of said transformer.

34. A power system for an electrical load switch having a controllable switching device for selectively connecting a load to a source of electrical current, and a switch controller, said power system comprising:

a switching regulator having an input connected across said controllable switching device and having an output, the switching regulator drawing a current proportional to a voltage applied thereto; and a transformer having a primary winding and a secondary winding, said primary winding being connected in series with said controllable switching device;

said output of said switching regulator being connected to supply a regulated supply voltage when said controllable switching device is in a non-conducting state, and said secondary winding being connected to supply said regulated supply voltage when said switching device is in a conducting state, said supply voltage being used to power said controllable switch and said switch controller.

35. The power system of claim 34, said switching regulator comprising a step down switching regulator circuit.

36. The power system of claim 34, said switching regulator having a switching frequency above 20 KHz.

37. The power system of claim 35, wherein the step down switching regulator circuit is a flyback converter.

38. The power system of claim 37, wherein the step down switching regulator circuit is a discontinuous current mode flyback converter.

39. The controllable electrical switch of claim 34, wherein the switching regulator has an input power factor of at least 0.6.

40. The controllable electrical switch of claim 39, wherein the switching regulator has an input power factor of at least 0.9.

41. The power system of claim 34, wherein the switching regulator accepts input voltages in the range of 8 volts to 440 volts rms.

42. The power system of claim 34, further comprising an energy storage capacitor connected across said output of said switching regulator for filtering said regulated supply voltage.

43. The power system of claim 40, further comprising a post regulator connected to said output of said energy storage capacitor, to further regulate said regulated supply voltage.

44. The controllable electrical switch of claim 43, said secondary of said transformer also being connected to said energy storage capacitor.

45. A two-wire wall switch replacement electrical load switch for selectively connecting a load to a source of electrical current trough hot and load conductors, said replacement electrical load switch comprising:
   a controllable switching device corrected between said hot and load conductors;
   a switch controller;
   a switching regulator having an input connected across said controllable switching device and having an output, the switching regulator drawing a current proportional to a voltage applied thereto; and
   a transformer having a primary winding and a secondary winding, said primary winding being connected in series with said controllable switching device;
   said output of said switching regulator being connected to supply a regulated supply voltage when said controllable switching device is in a non-conducting state, and said secondary winding being connected to supply said regulated supply voltage when said switching device is in a conducting state, said regulated supply voltage being used to power said controllable switching device and said switch controller.

46. A tree-wire wall switch replacement electrical load switch for selectively connecting a load to a source of electrical current tough hot and load conductors, and having a safety ground conductor, said replacement electrical load switch comprising:
   a controllable switching device connected between said hot and load conductors;
   a switch controller; and
   a switching regulator having an input connected between said hot and safety ground conductors, and having an output, the switching regulator drawing a current proportional. to a voltage applied thereto;
   said output of said switching regulator being connected to supply a regulated supply voltage when said controllable switching device is in a conducting or non-conducting state, said regulated supply voltage being used to power said controllable switching device and said switch controller.

47. The controllable electrical switch of claim 1, wherein the switching regulator supplies a first current to said switch controller and a second current to said load, the first current being greater than the second current.

48. The controllable electrical switch of claim 1, wherein the switching regulator provides an input power factor of at least 0.6.

49. The controllable electrical switch of claim 48, a voltage applied to said input of said switching regulator having a positive half cycle and a negative half cycle, and the switching regulator drawing current over a plurality of discrete time periods in each of said negative and positive half cycles.

50. A controllable electrical switch for selectively collecting a load to a source of electrical current having a line frequency, comprising:
   a controllable switching device having a conducting state and a nonconducting state, for selectively connecting the source of electrical current to the load;
   a switching regulator including a high frequency transformer operating at a frequency higher than the line frequency, the switching regulator having an input connected to said switching device and having an output providing a regulated voltage supply; and
   a switch controller, connected to and powered by said output of said switching regulator, for controlling said controllable switching device.

51. A controllable electrical switch for selectively connecting a load to a source of electrical current, comprising:
   a controllable switching device having a conducting state and a non-conducting state, for selectively connecting the source of electrical current to the load;
   a switching regulator having an input connected to said switching device and having an output providing a regulated voltage supply, wherein the switching regulator includes:
      a transformer having
         (a) a primary winding connected in series with said controllable switching device and
         (b) a secondary winding connected to supply said regulated output voltage when said controllable switching device is in the conducting state; and
   a switch controller, connected to and powered by said output of said switching regulator, for controlling said controllable switching device.

52. A controllable electrical switch for selectively connecting a load to a source of electrical current, comprising:
   a controllable switching device having a conducting state and a non-conducting state, for selectively connecting the source of electrical current to the load;
   a switching regulator having an input connected to said switching device and having an output providing a regulated voltage supply, wherein the switching regulator has an input power factor of at least 0.6; and
   a switch controller, connected to and powered by said output of said switching regulator, for controlling said controllable switching device.

* * * * *

UNITED STATES PATENT AND TRADEMARK OFFICE
CERTIFICATE OF CORRECTION

PATENT NO.    : 6,262,565 B1
DATED         : July 17, 2001
INVENTOR(S)   : Williams et al.

It is certified that error appears in the above-identified patent and that said Letters Patent is hereby corrected as shown below:

Column 16, claim 1,
Line 17, please delete "controllers" and insert -- controller -- therefor.

Column 18, claim 34,
Line 39, please delete "ail" and insert -- an -- therefor.

Column 19, claim 46,
Line 38, please delete "tree-wire" and insert -- three-wire -- therefor.

Column 19, claim 46,
Line 40, please delete "tough" and insert -- trough -- therefor.
Lines 48 and 49, please delete "." between "proportional" and "to".

Column 20, claim 50,
Lines 12 and 13, please delete "collecting" and insert -- connecting -- therefor.

Signed and Sealed this

Ninth Day of April, 2002

Attest:

*Attesting Officer*

JAMES E. ROGAN
*Director of the United States Patent and Trademark Office*